US 9,957,701 B2

(12) United States Patent
Ito et al.

(10) Patent No.: US 9,957,701 B2
(45) Date of Patent: May 1, 2018

(54) ROOF ASSEMBLY FOR A TRANSPORTABLE RESTROOM

(71) Applicant: Bertram Y. Ito, Pearl City, HI (US)

(72) Inventors: Bertram Y. Ito, Pearl City, HI (US); Jesus J. Peña, Yorba Linda, CA (US)

(73) Assignee: Bertram Y. Ito, Pearl City, HI (US)

( * ) Notice: Subject to any disclaimer, the term of this patent is extended or adjusted under 35 U.S.C. 154(b) by 0 days. days.

(21) Appl. No.: 15/360,784

(22) Filed: Nov. 23, 2016

(65) Prior Publication Data

US 2017/0159276 A1 Jun. 8, 2017

Related U.S. Application Data

(63) Continuation-in-part of application No. 15/157,110, filed on May 17, 2016, now Pat. No. 9,879,437, which is a continuation-in-part of application No. 13/759,803, filed on Feb. 5, 2013, now Pat. No. 9,340,963.

(51) Int. Cl.
*E04H 1/12* (2006.01)
*E03D 9/04* (2006.01)
*A47K 11/02* (2006.01)
*A47K 1/02* (2006.01)

(52) U.S. Cl.
CPC ............ *E03D 9/04* (2013.01); *A47K 1/02* (2013.01); *A47K 11/02* (2013.01); *E04H 1/1216* (2013.01)

(58) Field of Classification Search
CPC ...... E04H 1/1216; E04H 1/1244; F24F 7/025; H02S 20/22; H02S 20/23; H02S 20/24; H02S 20/30; H02S 20/32

USPC .............. 4/209 R, 475, 476, 477, 482, 218
See application file for complete search history.

(56) References Cited

U.S. PATENT DOCUMENTS

| 1,120,251 | A | | 12/1914 | Tabbert | |
|---|---|---|---|---|---|
| 1,199,391 | A | | 9/1916 | Leitner | |
| 2,638,835 | A | * | 5/1953 | Strawsine | F24F 7/025 454/117 |
| 3,412,670 | A | * | 11/1968 | Jenn | F24F 7/025 454/352 |

(Continued)

FOREIGN PATENT DOCUMENTS

| GB | 191417828 | | 7/1915 | |
|---|---|---|---|---|
| GB | 1116662 A | * | 6/1968 | F24F 7/025 |

(Continued)

*Primary Examiner* — Erin Deery
(74) *Attorney, Agent, or Firm* — Shlesinger, Arkwright & Garvey LLP

(57) ABSTRACT

A roof assembly for a portable restroom includes a curved roof having a plurality of raised ribs extending parallel to each other, the curved roof including an opening between two of the raised ribs; a fan housing disposed in the opening of the roof, the fan housing having four sidewalls and top and bottom openings, the fan housing including extension portions extending outwardly from the sidewalls; a fan disposed in the fan housing; and a vent cap with sidewalls and a top wall overlying the top opening of the fan housing, the sidewalls of the vent cap are configured to include the extension portions within the vent cap such that a first gap is provided between the sidewalls of the fan housing and the sidewalls of the vent cap, the top wall is disposed spaced apart from the sidewalls of the fan housing to provide a second gap communicating with the first gap.

9 Claims, 29 Drawing Sheets

(56) References Cited

U.S. PATENT DOCUMENTS

| | | | | |
|---|---|---|---|---|
| 3,447,167 A | * | 6/1969 | Harding | A47K 11/035 4/462 |
| 3,525,297 A | * | 8/1970 | Kawai | F24F 7/025 454/21 |
| 3,877,357 A | * | 4/1975 | Felter | F24F 7/025 137/527.8 |
| 3,949,430 A | | 4/1976 | Miller et al. | |
| 3,992,727 A | | 11/1976 | Elkins | |
| 4,031,572 A | | 6/1977 | Harding | |
| 4,163,294 A | | 8/1979 | Patterson | |
| 4,185,337 A | | 1/1980 | Sargent et al. | |
| 4,305,164 A | | 12/1981 | Sargent et al. | |
| 4,378,191 A | | 3/1983 | Sato | |
| 4,432,273 A | | 2/1984 | Devitt | |
| 4,761,840 A | | 8/1988 | Harding | |
| 4,776,631 A | | 10/1988 | Sargent et al. | |
| 4,805,660 A | | 2/1989 | Antos et al. | |
| 4,888,832 A | | 12/1989 | Cameron | |
| 4,892,349 A | | 1/1990 | Sargent | |
| 4,908,885 A | | 3/1990 | Antos | |
| 4,944,048 A | | 7/1990 | Sargent et al. | |
| 4,974,899 A | | 12/1990 | Sargent | |
| 5,031,249 A | | 7/1991 | Sargent | |
| 5,056,166 A | | 10/1991 | Sargent et al. | |
| 5,060,320 A | | 10/1991 | Sargent et al. | |
| 5,073,994 A | | 12/1991 | Sargent et al. | |
| 5,078,047 A | * | 1/1992 | Wimberly | E04D 13/17 454/366 |
| 5,299,327 A | * | 4/1994 | Wilkerson | E03F 5/08 4/213 |
| 5,318,275 A | | 6/1994 | Sargent et al. | |
| 5,363,510 A | | 11/1994 | Chlebek | |
| 5,398,465 A | | 3/1995 | Tagg | |
| 5,500,960 A | | 3/1996 | Tagg | |
| 5,513,395 A | | 5/1996 | Chlebek et al. | |
| 5,560,050 A | | 10/1996 | Tagg | |
| 5,761,864 A | | 6/1998 | Nonoshita | |
| 5,875,499 A | | 3/1999 | Hoffman et al. | |
| 6,158,061 A | | 12/2000 | Cameron et al. | |
| 6,164,214 A | | 12/2000 | Smorgon et al. | |
| 6,189,161 B1 | | 2/2001 | Rijn et al. | |
| 6,327,719 B1 | | 12/2001 | Lobertmann et al. | |
| 6,430,757 B1 | | 8/2002 | Pohler | |
| 6,438,902 B1 | | 8/2002 | Muller | |
| 6,507,958 B1 | | 1/2003 | Tagg | |
| 6,754,997 B2 | | 6/2004 | Bonin | |
| 6,804,840 B2 | | 10/2004 | Berman | |
| 6,871,361 B2 | | 3/2005 | Grech et al. | |
| 7,293,298 B2 | | 11/2007 | Cameron et al. | |
| 7,373,757 B2 | | 5/2008 | Hampel | |
| 7,765,625 B2 | | 8/2010 | Durrani et al. | |
| 7,861,331 B2 | | 1/2011 | Grech et al. | |
| RE42,688 E | | 9/2011 | Stegall | |
| 8,052,100 B2 | * | 11/2011 | Zante | H02S 20/30 126/600 |
| 8,176,577 B2 | | 5/2012 | Grech et al. | |
| 8,215,421 B2 | * | 7/2012 | Schneider | A61G 5/10 180/2.2 |
| 8,230,531 B2 | | 7/2012 | Miller et al. | |
| 8,276,218 B2 | | 10/2012 | Grech | |
| 8,904,571 B2 | | 12/2014 | Morre | |
| 9,303,420 B2 | | 4/2016 | Van Der Linde | |
| 2003/0024191 A1 | | 2/2003 | Hampel | |
| 2005/0046131 A1 | | 3/2005 | Gunderson | |
| 2005/0241055 A1 | | 11/2005 | Mullett et al. | |
| 2006/0277675 A1 | | 12/2006 | Tinnell | |
| 2008/0184471 A1 | | 8/2008 | Hampel | |
| 2009/0100585 A1 | | 4/2009 | Roberts | |
| 2010/0050330 A1 | * | 3/2010 | Earlywine | E03D 3/10 4/321 |
| 2011/0030802 A1 | | 2/2011 | Moore | |
| 2012/0167297 A1 | * | 7/2012 | Poust | B60R 15/04 4/321 |
| 2013/0167293 A1 | | 7/2013 | Nakaya | |
| 2014/0143945 A1 | | 5/2014 | Chen et al. | |
| 2014/0215702 A1 | | 8/2014 | Ito | |
| 2017/0237391 A1 | * | 8/2017 | Michotte De Welle | H02S 20/32 248/372.1 |

FOREIGN PATENT DOCUMENTS

| | | | |
|---|---|---|---|
| JP | 07292750 | 11/1995 | |
| WO | WO 2012113220 A1 * | 8/2012 | E04H 1/1216 |
| WO | WO 2016/078682 | 5/2016 | |

* cited by examiner

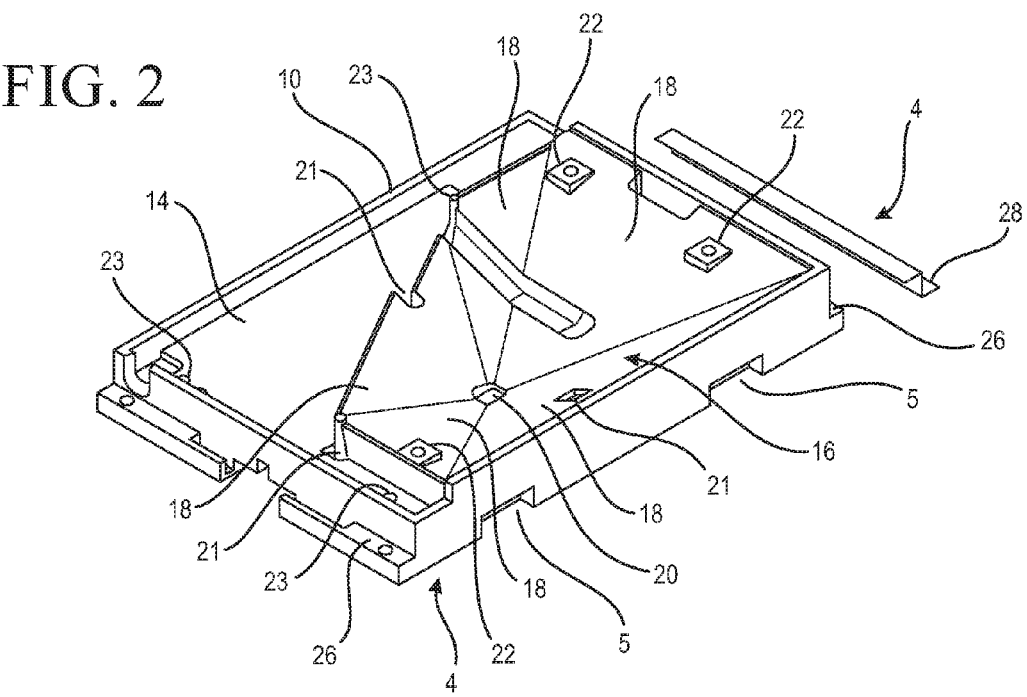
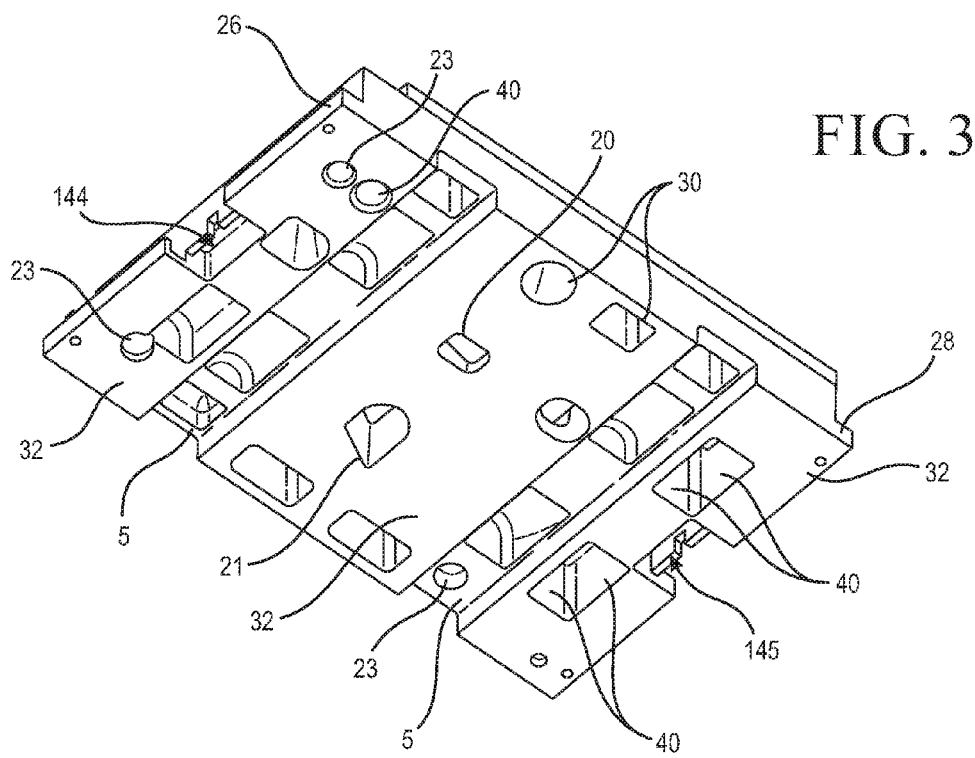

ROOF ASSEMBLY FOR A TRANSPORTABLE RESTROOM

RELATED APPLICATIONS

This is a continuation-in-part application of application Ser. No. 15/157,110 filed on May 17, 2016, which is a continuation-in-part application of application Ser. No. 13/759,803 filed on Feb. 5, 2013, which applications are hereby incorporated by reference.

FIELD OF THE INVENTION

The present invention is generally directed to portable restrooms and in particular to transportable restrooms for temporary use in places where municipal sewer and water hookups are not available.

SUMMARY OF THE INVENTION

The present invention provides a roof assembly having a roof with a plurality of raised ribs extending parallel to each other, the roof including an opening between two of the raised ribs; a fan housing disposed in the opening of the roof, the fan housing having four sidewalls and top and bottom openings, the fan housing including extension portions extending outwardly from the sidewalls; a fan disposed in the fan housing; and a vent cap with sidewalls and a top wall overlying the top opening of the fan housing, the sidewalls of the vent cap are configured to include the extension portions within the vent cap such that a first gap is provided between the sidewalls of the fan housing and the sidewalls of the vent cap, the top wall is disposed spaced apart from the sidewalls of the fan housing to provide a second gap communicating with the first gap.

The present invention also provides a fan assembly for a portable restroom, comprising a fan housing with four sidewalls and top and bottom openings, the fan housing including extension portions extending outwardly from the sidewalls, the fan housing is configured to be installed in an opening in a roof of the portable restroom; a fan disposed in the fan housing; and a vent cap with sidewalls and a top wall overlying the top opening, the sidewalls of the vent cap are configured to include the extension portions within the vent cap such that a first gap is provided between the sidewalls of the fan housing and the sidewalls of the vent cap, the top wall is disposed spaced apart from the sidewalls of the fan housing to provide a second gap communicating with the first gap.

The present invention further provides a solar panel assembly for a portable restroom, comprising first and second brackets to be attached to a sidewall of the portable restroom; a solar panel pivotably attached between the first and second brackets, the solar panel being positionable between a horizontal position to a vertical position; each of the brackets including an arcuate slot; and a lock operably attached to the solar panel and the arcuate slots, the lock being received within the arcuate slot to lock the solar panel in a selected position between the horizontal position to the vertical position.

The present invention also provides a transportable restroom, comprising a skid; a clean water tank carried by the skid; a waste water tank carried by the skid; the clean water tank and the waste water tank are disposed side to side on the skid to form a unitary base; wall extending from the base including a door; a roof over the wall, the roof having a plurality of raised ribs extending parallel to each other, the curved roof including an opening between two of the raised ribs; an electric fan disposed in an opening in the roof to exhaust air from the inside of the restroom to the outside; and a cap disposed over the opening, the cap including a downwardly extending peripheral wall having a bottom edge spaced apart from the roof to provide an outlet to the outside for the air being exhausted from the inside, the peripheral wall including first and second opposite sides disposed beyond the respective two of the raised ribs.

BRIEF DESCRIPTION OF THE DRAWINGS

FIG. 2 is a top perspective view of a skid embodying the present invention.

FIG. 3 is a bottom perspective view of the skid shown in FIG. 1.

DETAILED DESCRIPTION OF THE INVENTION

Figure 1:
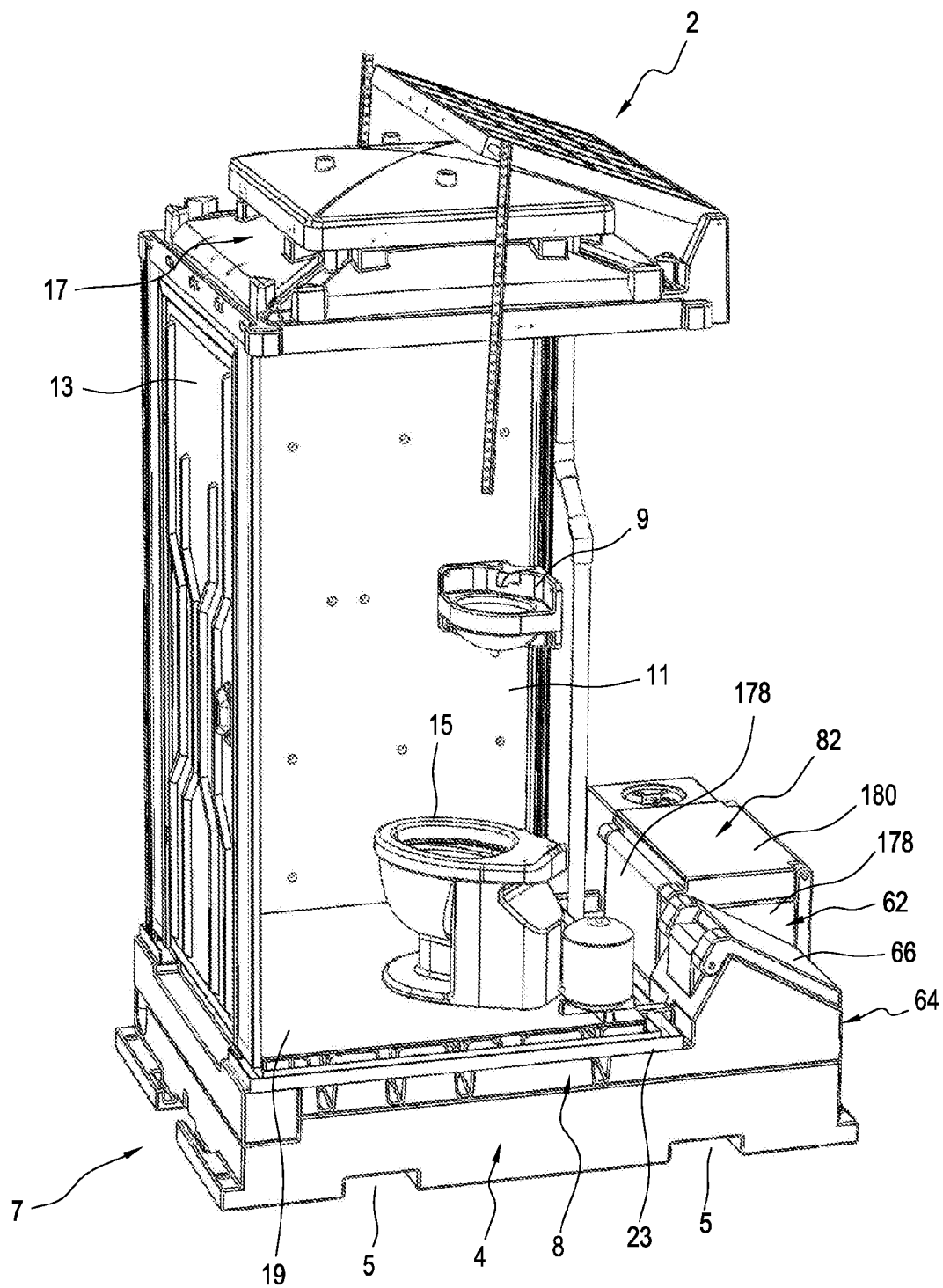
FIG. 1 is a perspective view of a transportable restroom with portions shown broken away, embodying the present invention.

Referring to FIG. 1, a transportable and self-contained restroom 2 is disclosed in U.S. Pat. No. 9,340,963, hereby incorporated by reference. The restroom 2 includes a preferably one-piece molded rectangular skid 4 configured for lifting by a standard forklift (not shown) for loading onto and unloading from a truck for transport to a site where the restroom 2 is to be used. The skid 4 includes slots 5 for receiving the lifting arms of the forklift. The forklift may also be used for positioning the restroom 2 at a specific location at the site. A one-piece molded clean water tank 6 and a one-piece molded waste water tank 8 are disposed on the skid 4. The clean water tank 6 and the waste water tank 8 are separate (not connected) and independent from each other so that a leak in one tank will not affect the other tank. The tanks 6 and 8 nest or mate together over the skid 4 to form a rectangular base 7 for the restroom 2. A sheet 19 made of plastic or other suitable material is laid on top of the tanks 6 and 8 to advantageously provide a flat and continuous surface to cover the breaks and crannies on the top walls of tanks and aid in clean-up with water spraying.

The restroom 2 has walls 11 on three sides (one wall is shown), a door 13, a roof 17, a toilet 15 and a hand wash 9. The walls 11 are attached to a U-shaped member 23 attached to the top wall of water tanks.

The weight of the clean water tank 6 or the waste water tank 8 when full and their lower location with respect to the ground advantageously anchors the restroom to the ground and advantageously provide a lower center of gravity for the restroom 2 for stability.

Referring to FIG. 2, the skid 4 includes a peripheral flange 10 that mates with a peripheral step 12 (see FIGS. 5 and 7) along the outer bottom edges of the tanks 6 and 8. The flange 10 advantageously keeps the tanks 6 and 8 contained within the outer boundary of the skid 4. The skid 4 includes a top horizontal flat wall 14 and a recess 16 formed from triangular wall portions 18 joined to form an inverted pyramid.

The flat wall 14 supports the clean water tank 6. The recess 16 extends downwardly from below the level of the wall 14. The triangular wall portions 18 support the waste water tank 8.

The lowest part of the bottom of the recess 16 has an opening 20 for draining water to the ground. An opening 21 communicates with the top wall 14 for draining water to the ground. Bosses 22 are provided for attachment of the waste water tank 8 to the skid 4. Holes 23 are provided for attachment of the clean water tank 6 to the skid 4. Flange portions 26 at the front and rear of the skid 4 are provided for securing with respective Z-bars 28 (one is shown) attached to a flatbed trailer to keep the restroom 2 secured to the flatbed trailer during transport. The restroom 2 slides into or out of the Z-bars 28.

Referring to FIG. 3, the underside of the skid 4 is shown. The slots 5 extend through the width of the skid. Several kiss-offs 30 help support the weight of the tanks 6 and 8 and transfer the weight to the ground. The bottom of the skid includes several flat walls 32 for maximum surface contact with the ground for effective support of the weight of the restroom 2. The bosses 22 are supported by vertical walls 40 to transmit the weight of the waste water tank 8 to the ground.

Figure 4:
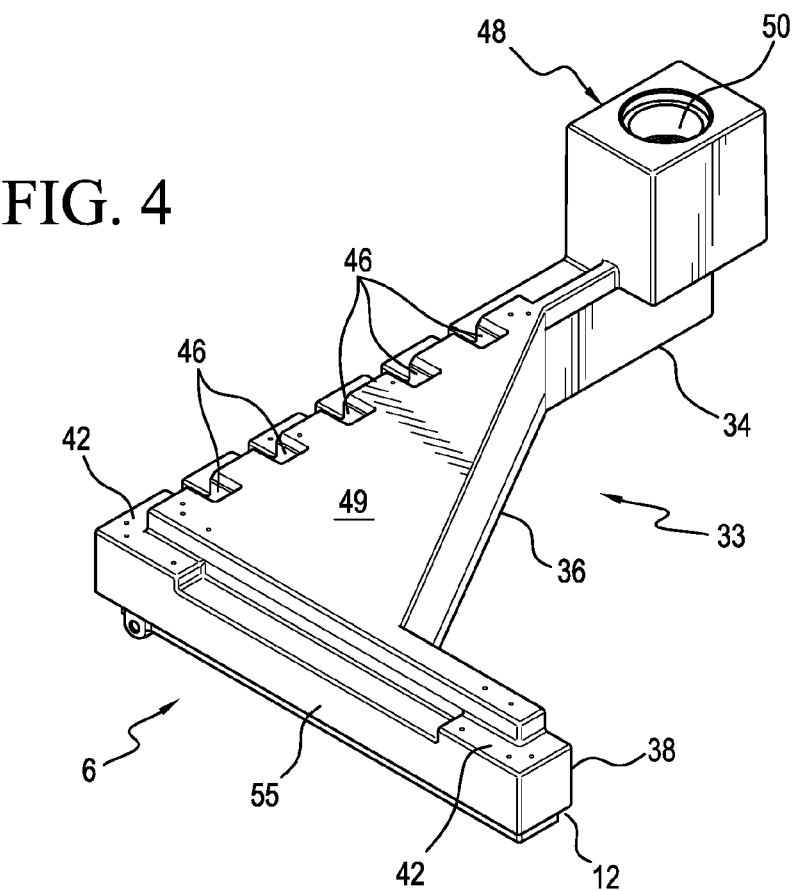
FIG. 4 is a top perspective view of a clean water tank embodying the present invention.

Referring to FIG. 4, the clean water tank 6 includes a slot 33 into which the waste water tank 8 is nested. The slot 33 includes sides 34, 36 and 38. Flange portions 42 are provided around the outer periphery of the tank 6 for attachment of the U-shaped member 23, which is used to attach the walls 11. Slots 46 that communicate with the interior of the restroom 2 and the outside are provided along one side of the clean water tank 6. The slots 46 advantageously allow water used to clean the inside of the restroom 2 to flow to the outside. The slots 46 are also used to draw air from the outside into the interior of a double-space wall as will be described below. Fresh water fill port 48 is provided with a recess 50 with a strainer for salt pellets for used during cold weather to prevent water freezing. A top wall 49 receives a user as he/she enters the door 13 disposed above the side 55. The fill port 48 is advantageously located outside the walls 11 so that the clean water tank 6 can be refilled without going inside the restroom 2.

Figure 5:
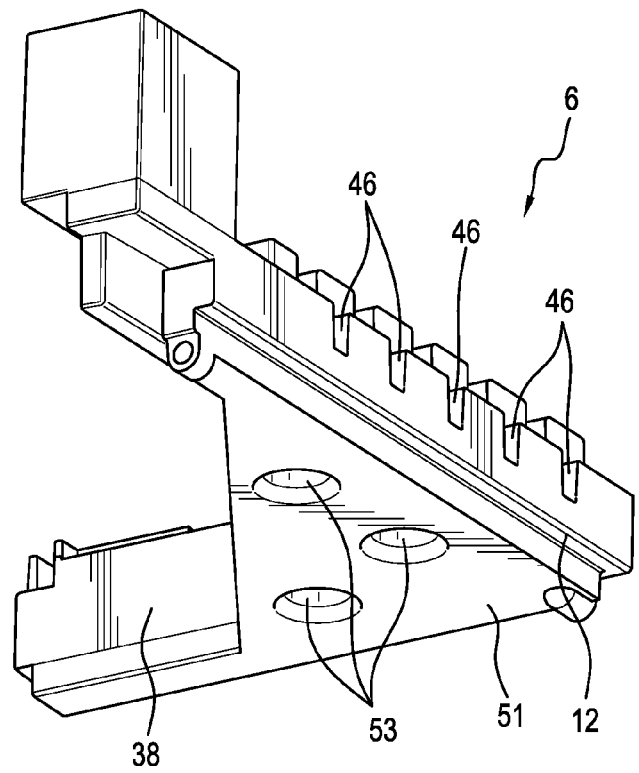
FIG. 5 is a bottom perspective view of the clean water tank shown in FIG. 4.

Referring to FIG. 5, the clean water tank 6 includes a flat bottom wall 51 that mates with the flat top wall 14 of the skid 4, advantageously supporting the clean water 6 with maximum surface contact. Conical walls 53 as disclosed in U.S. Pat. No. 9,340,963 provide support to the top wall 49, transferring the load of the tank and the user to the skid and to the ground.

Figure 6:
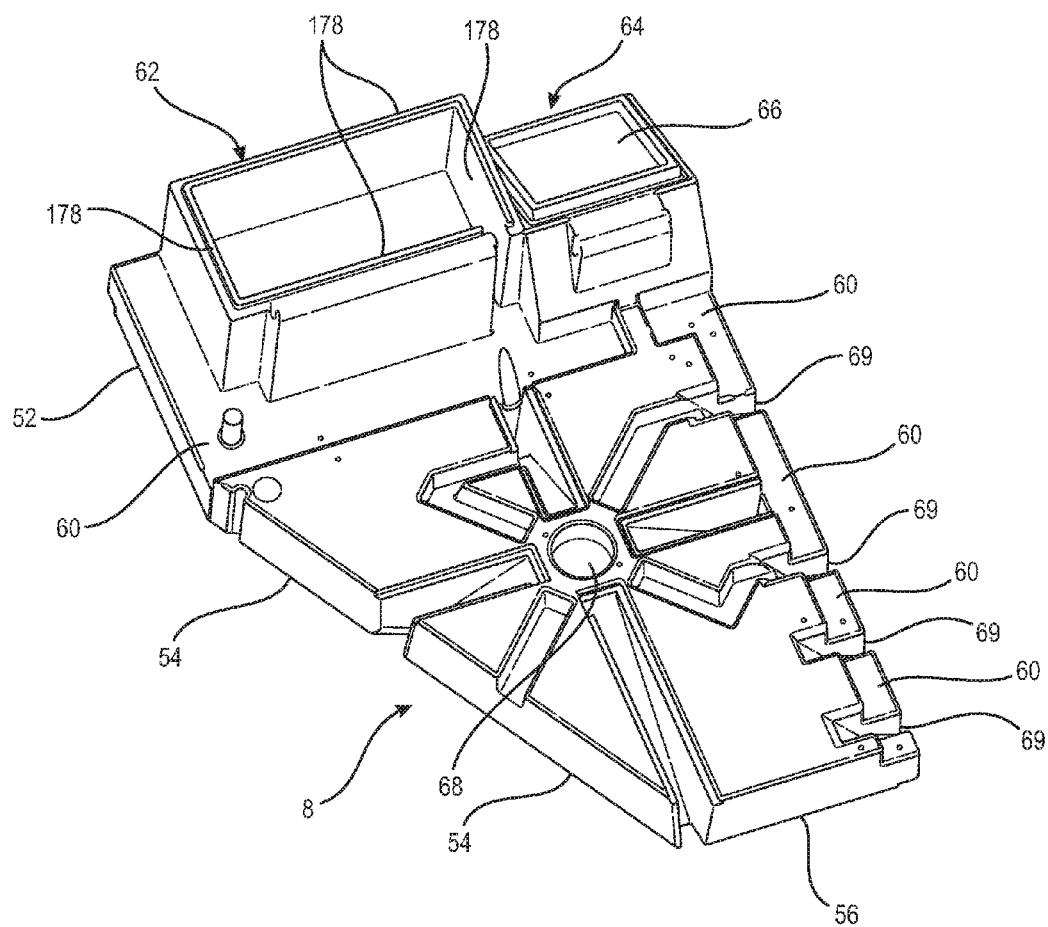
FIG. 6 is a top perspective view of a waste water tank embodying the present invention.

Referring to FIG. 6, the waste water tank 8 includes sides 52, 54 and 56 that mate with respective sides 34, 36 and 38 of the clean water tank 6. Flanges 60 are provided for mounting the U-shaped member 23. A housing 62 for a battery is provided at one end of the waste water tank. An access 64 into the interior of the waste water tank 8 permits vacuuming and cleaning of the waste water tank. An openable cover 66 keeps the access closed to keep odor in. An opening 68 into the waste water tank 8 is configured to receive the outlet of the toilet 15. Slots 69 that communicate with the interior of the restroom 2 and the outside are provided along one side of the waste water tank 8. The slots 69 advantageously allow water used to clean the inside of the restroom 2 to drain to the outside. The slots 69 are also used to draw air from the outside into the interior of a double-space wall as will be described below.

Figure 7:
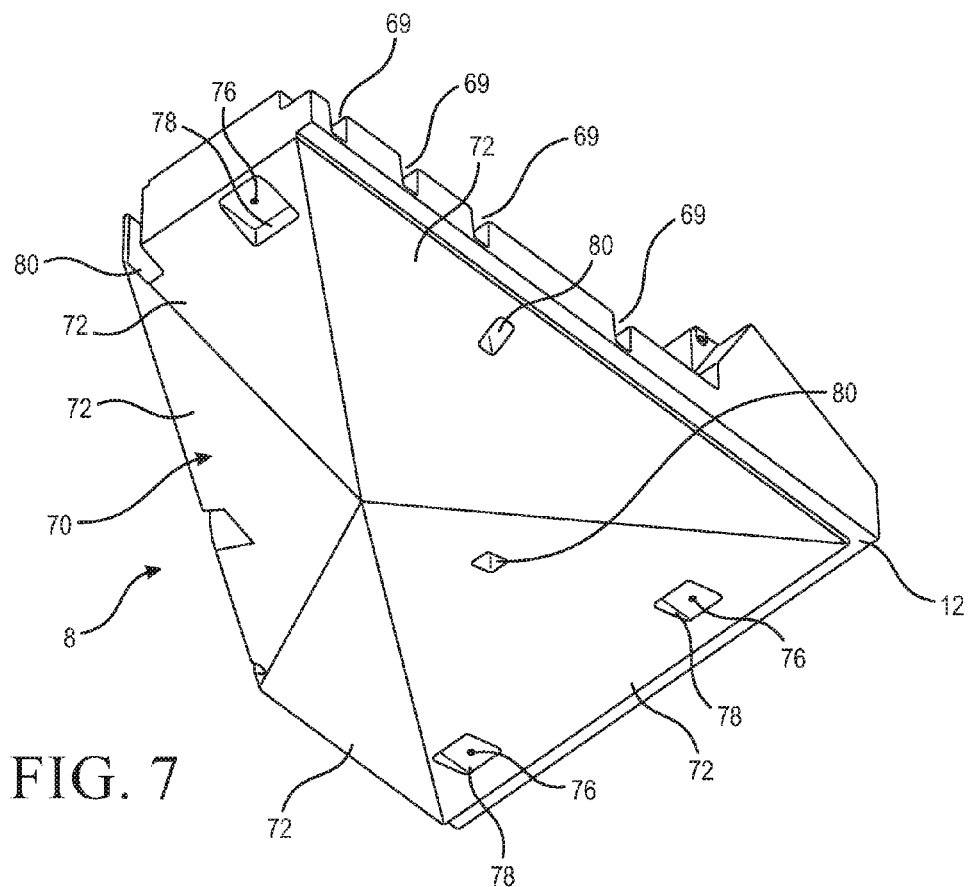
FIG. 7 is a bottom perspective view of the waste water tank shown in FIG. 6.

Referring to FIG. 7, a bottom perspective view of the waste water tank 8 is disclosed. The bottom wall 70 is made up of several triangular shaped wall portions 72 descending downwardly to a common low point to form an inverted pyramid shape. The wall portions 72 mate with the corresponding wall portions 18 of the skid 4. The wall portions 72 meet at an apex 74, which is substantially below the opening 68, thereby allowing the waste solids to accumulate in the lowest point of the waste water tank 8 for easier cleaning. Horizontal pads 76 are disposed within respective recesses 78, which are configured to receive the respective bosses 22 on the skid 4. Through-openings 80 are aligned with the openings 21 in the skid 4 to allow for drainage of cleaning water.

Figure 8:
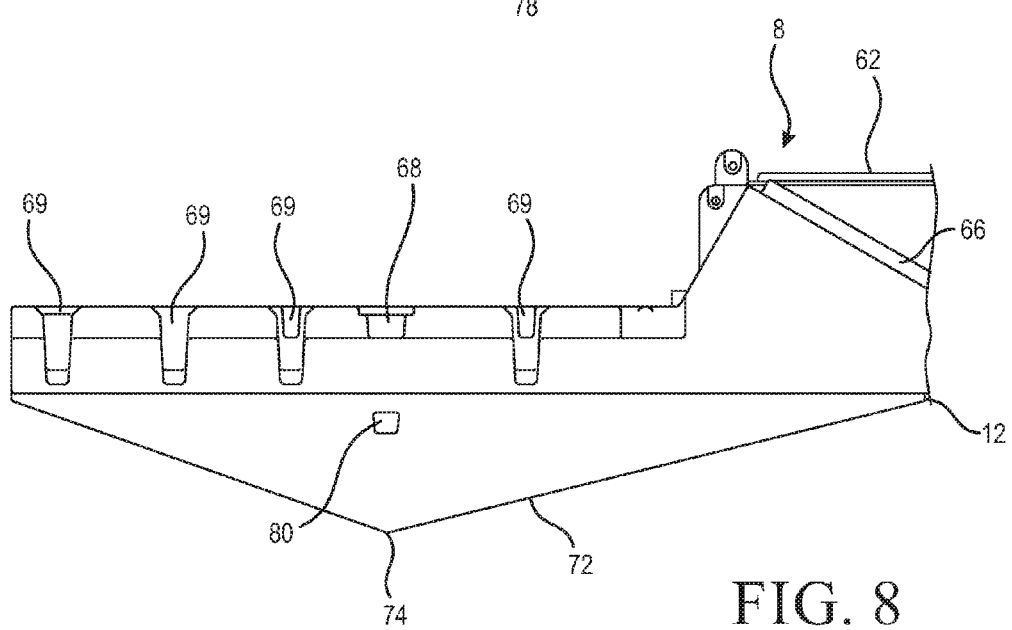
FIG. 8 is a side elevational view of the waste water tank shown in FIG. 6.

Referring to FIG. 8, the bottom wall 70 of the waste water tank 8 is shown angled downwardly toward the apex 74. The angle of inclination from the horizontal is configured to provide a larger capacity for the waste water tank 8 and for easier cleaning, since the waste solids will tend to settle toward the apex 74, which is at a line of sight from the access 64 when the door 66 is opened. The apex 74 is advantageously disposed below the toilet opening 68 so that waste solids will drop directly into the apex 74. Rinse water used for spraying the interior of the tank 8 would also drain readily toward the apex 74 for easier vacuuming. The access 64 is advantageously located outside the walls 11 and is, therefore, accessible from the outside.

Figure 9:
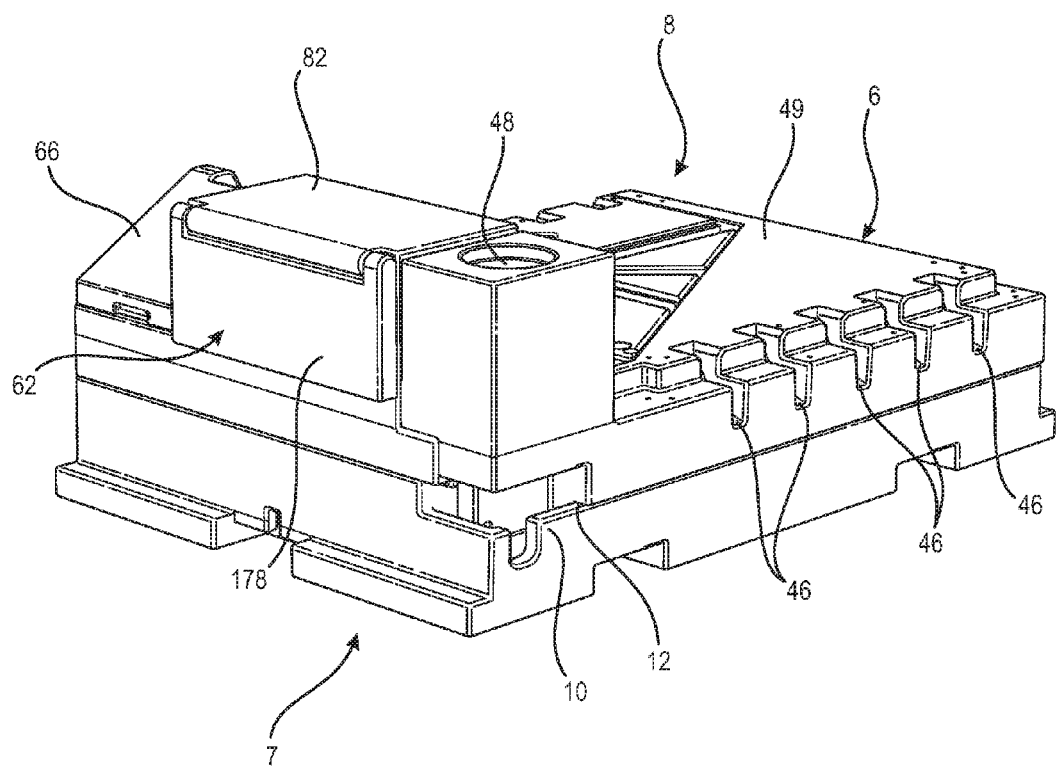
FIG. 9 is a rear top perspective view of the clean water tank and the waste water tank nested together on top of the skid to form a unitary base.

Referring to FIG. 9, the clean water tank 6 and the waste water 8 are shown nested to each other over the skid 4 to form a unitary base. An openable cover 82 is provided for the housing 62 for access to the battery for maintenance or replacement. The side 36 of the clean water tank 6 is configured to abut and engage the sides 54 of the waste water tank 8 for rigidity to the top wall 49 to provide support to the user when he/she enters the restroom 2 and steps over the top wall 49. The vertical walls on the sides 36 and 54 when they are nested together advantageously provide additional load bearing strength for a user standing on or near the sides 36 and 54 to resist shear and compression loads.

Figure 10:
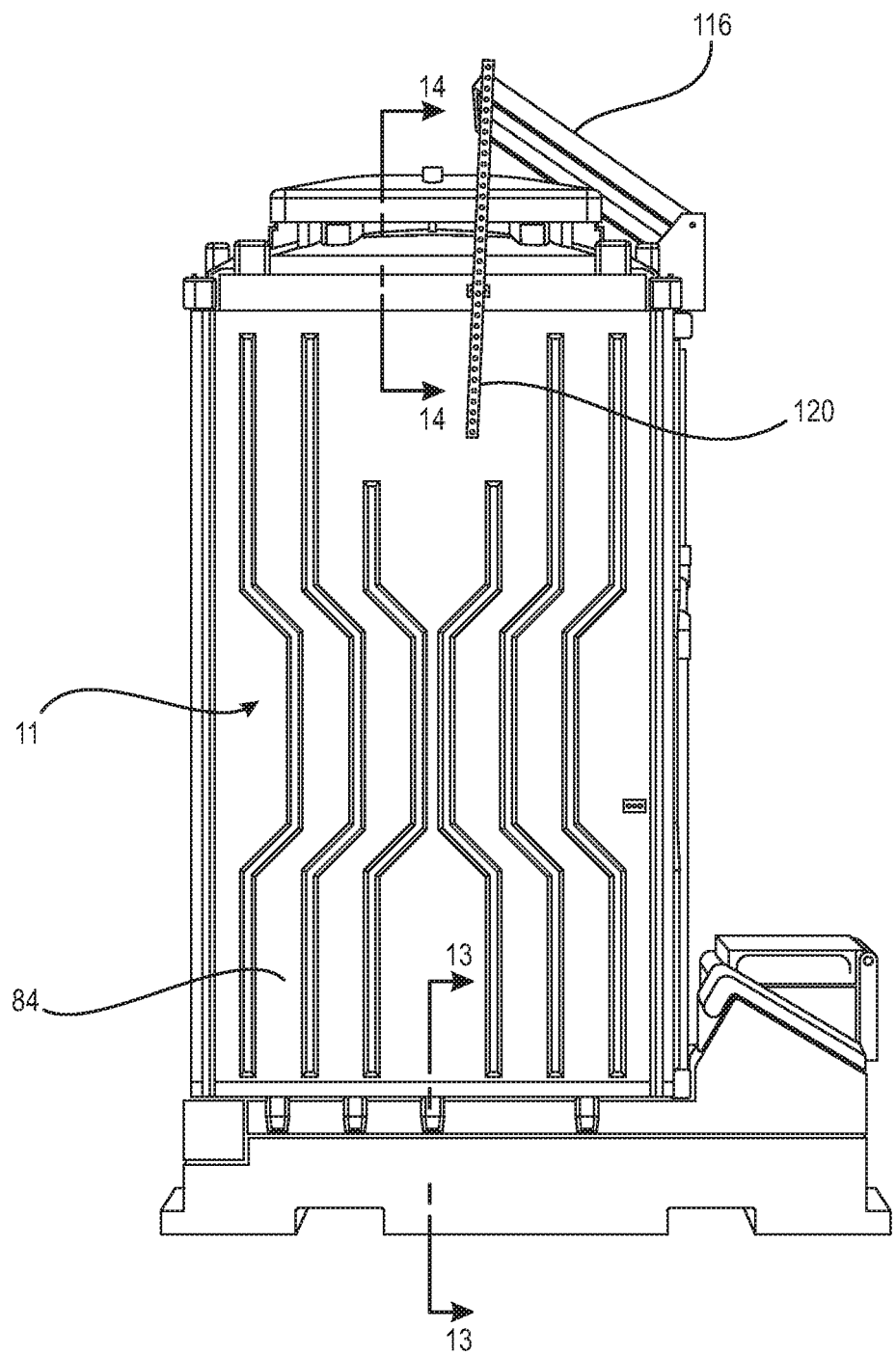
FIG. 10 is a side elevational view of the transportable restroom of FIG. 1, showing a solar panel in a deployed position.
Figure 11:
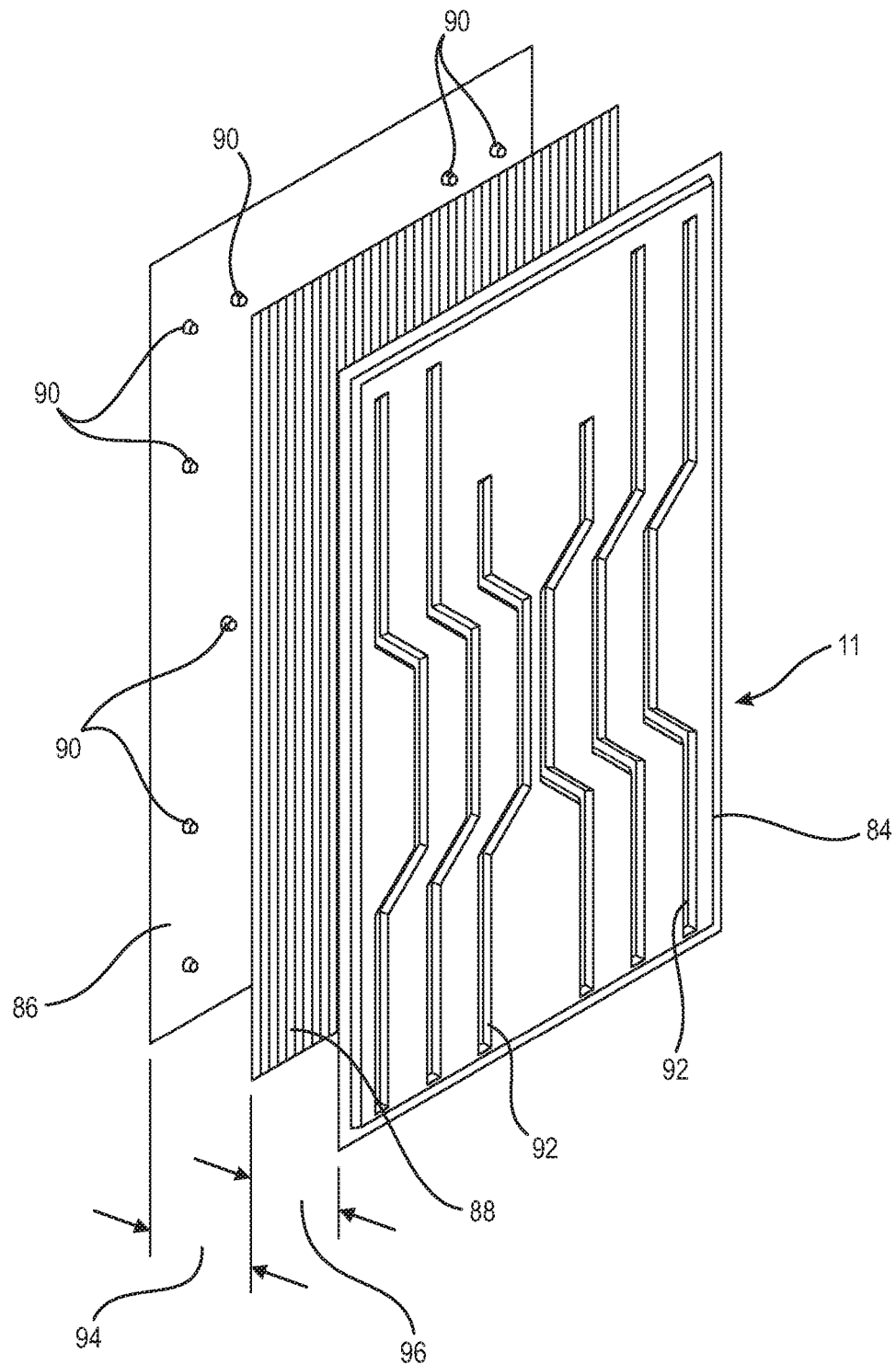
FIG. 11 is a perspective assembly drawing of a wall construction of the transportable restroom embodying the present invention.
Figure 12:
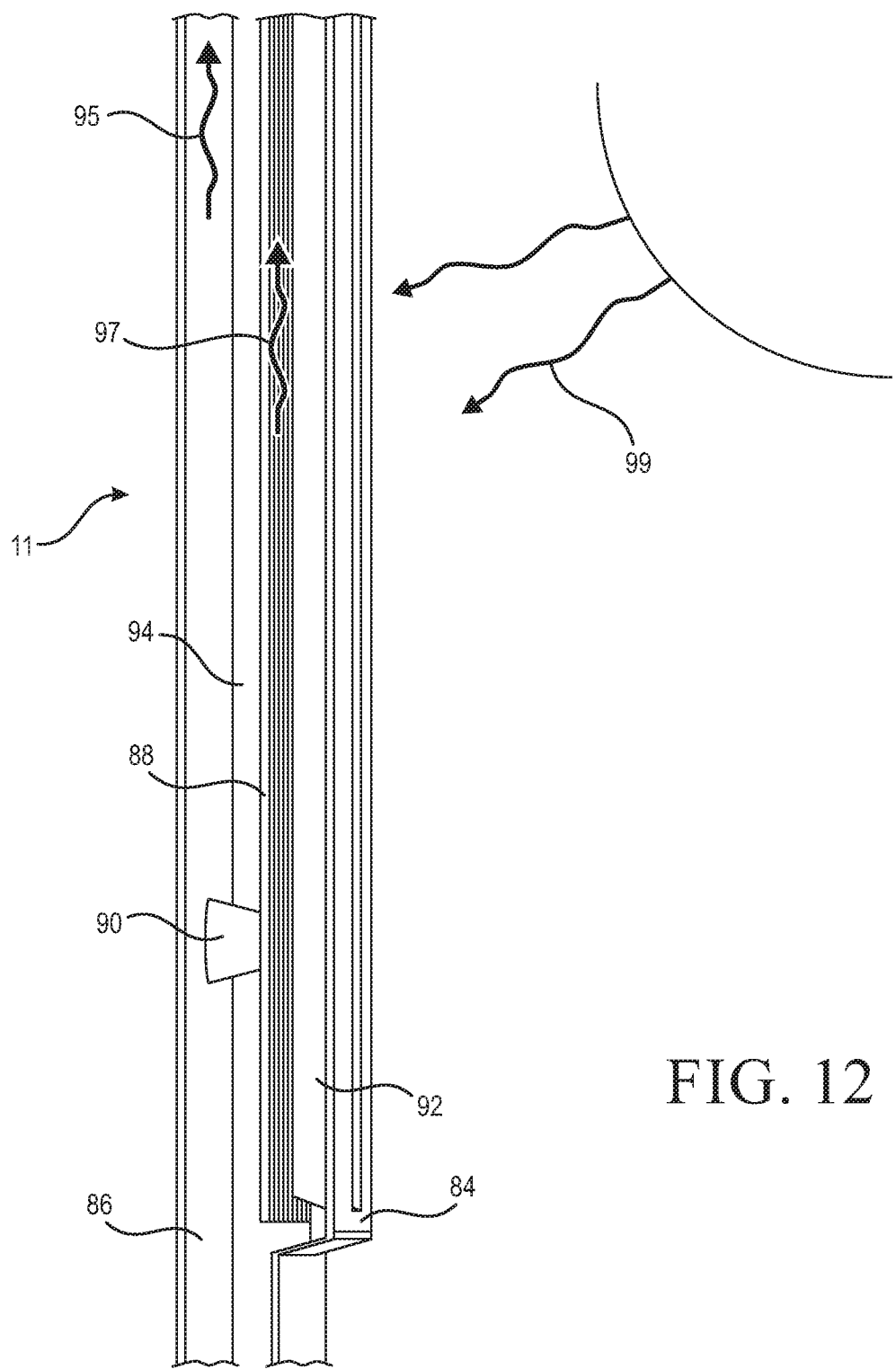
FIG. 12 is an edge perspective view of the wall construction shown in FIG. 11.

Referring to FIGS. 10, 11 and 12, the wall 11 is a double-space wall construction with an outer wall 84, an inner wall 86 spaced from the outer wall 84 with an intermediate radiant barrier 88 in between. The inner wall 86 includes a plurality of projections 90 space the radiant barrier 88 away from the inner wall 86. A plurality of ribs 92 extends inwardly into the interior space of the wall 11 to space the radiant barrier 88 away from the outer wall 84. The resulting assembly provides air space 94 between the inner wall 86 and radiant barrier 88 and air space 96 between the outer wall 84 and the radiant barrier 88. The air spaces 94 and 96 promote convection air flow to carry heat impinging on the outer wall 84 to the outside. The radiant barrier 88, which is preferably made of an aluminum foil layer over a polyethylene sheet, commercially available from ASTRO-FOIL International, is disposed inside the wall 11 such that the foil layer faces the outer wall 84 to reflect radiation away from the inner wall 86. The air spaces 94 and 96 are preferably each about 0.75 inches. Hot air flows 95 and 97 in the respective spaces 94 and 96 advantageously help moderate the temperature inside the restroom 2 against the solar radiation 99 impinging on the wall 11.

Figure 13:
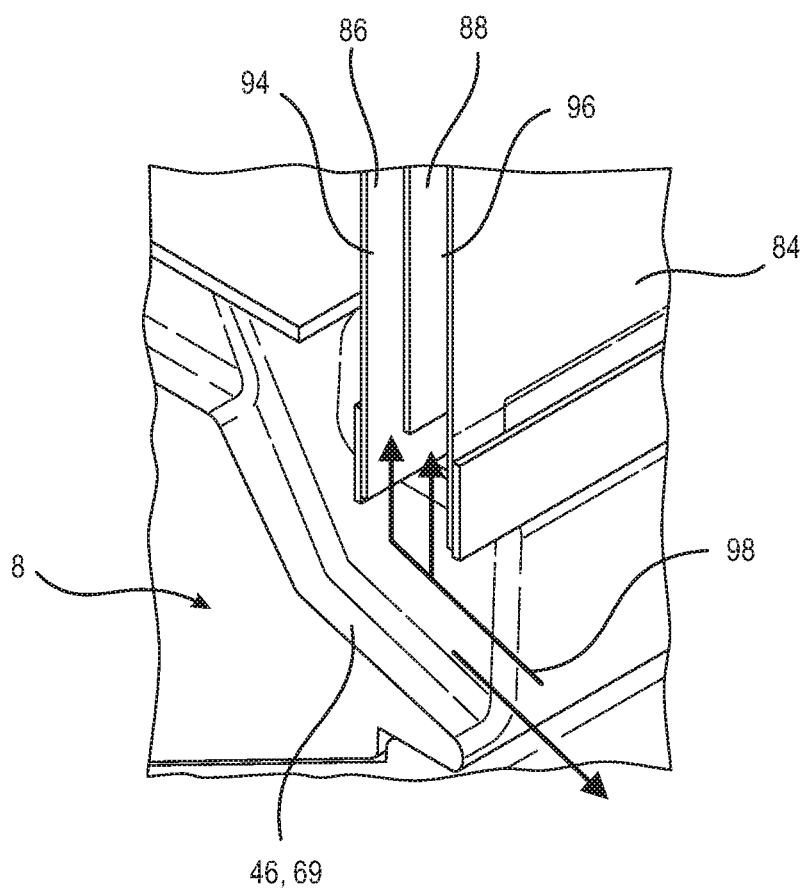
FIG. 13 is a perspective cross-sectional view taken along line 13-13 in FIG. 10.
Figure 14:
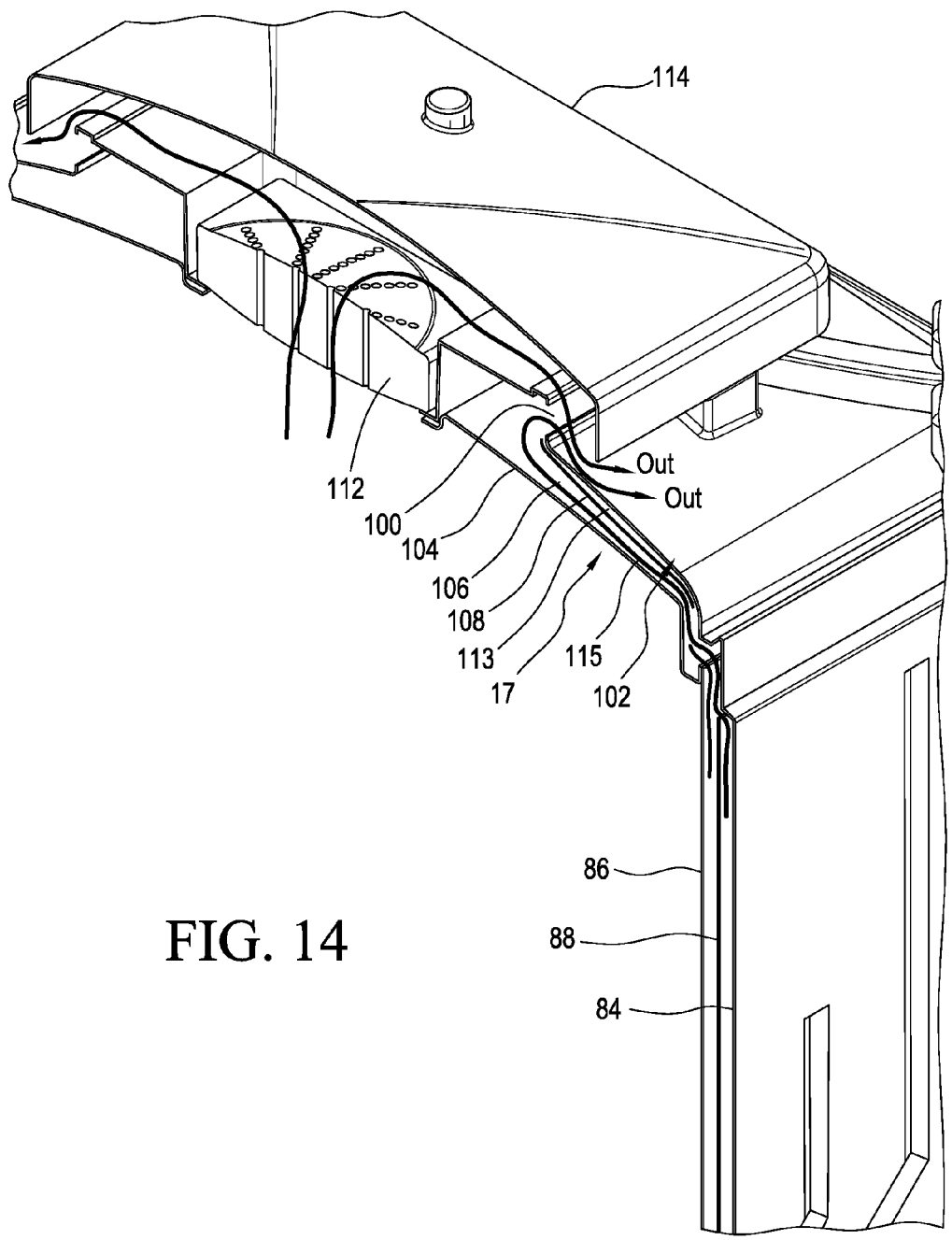
FIG. 14 is a perspective cross-sectional view taken along line 14-14 in FIG. 10.
Figure 15:
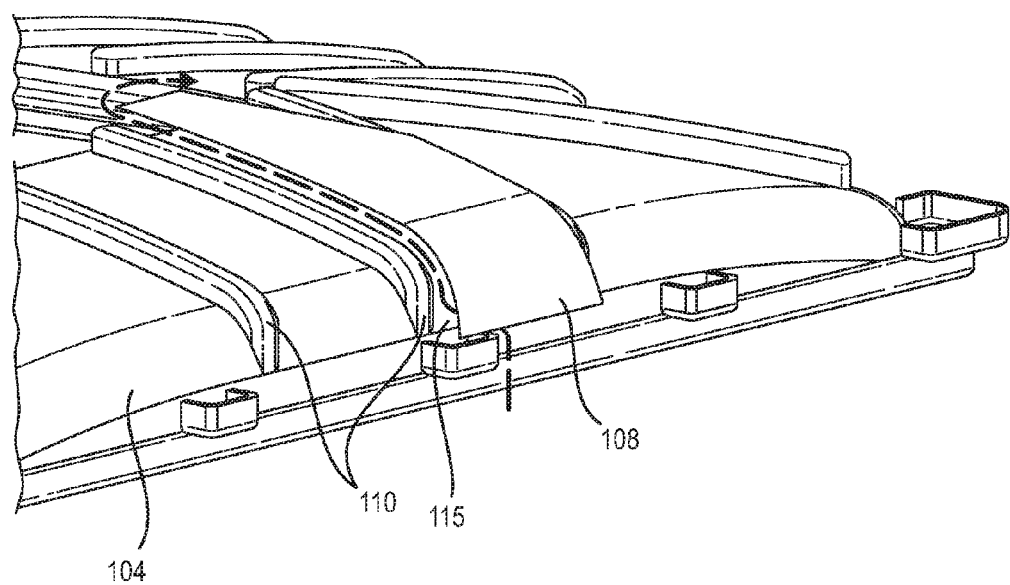
FIG. 15 is a perspective view of a roof structure of the transportable restroom embodying the present invention.

Referring to FIGS. 13 and 14, cool air flow 98 enters the spaces 94 and 96 through the respective slots 69 along the side of the waste water tank 8 and the slots 46 along the side of the clean water tank 6 and exits out through a vent 100 in the roof 17. The cool air flow 98 absorbs the heat within the spaces 94 and 96 as it flows upwardly before discharging through the opening 100 at the roof. Accordingly, the double-space construction of the wall 11 helps prevent the interior of the restroom 2 from overheating.

The roof 17 includes an outer wall 102 spaced from an inner wall 104, creating a space 106 for the air flow 98 from the bottom of the wall 11. A radiant barrier 108 is disposed between spacer ribs 110 to create a space 115 between the inner wall 104 and the radiant barrier 108. Another space 113 between the radiant barrier and the outer wall 102 may also be created. The outer wall 102 is disposed over the radiant barrier 108. The radiant barrier 108, which is preferably made of an aluminum foil layer over a polyethylene sheet, commercially available from ASTRO-FOIL International, is adhered over the spacer ribs 110 such that the foil layer faces the outer wall 102 to reflect radiation away from the inner wall 104. The spaces 106 and 113 communicate with the spaces 94 and 96 in the wall 11 to allow the flow of hot air to exit through the vent 100.

An electric fan 112 disposed at the roof 17 provides additional ventilation inside the restroom 2. Cool air is drawn through the bottom slots 69 and 46 and out through a vent opening 100 to the outside under a cover 114.

Figure 16:
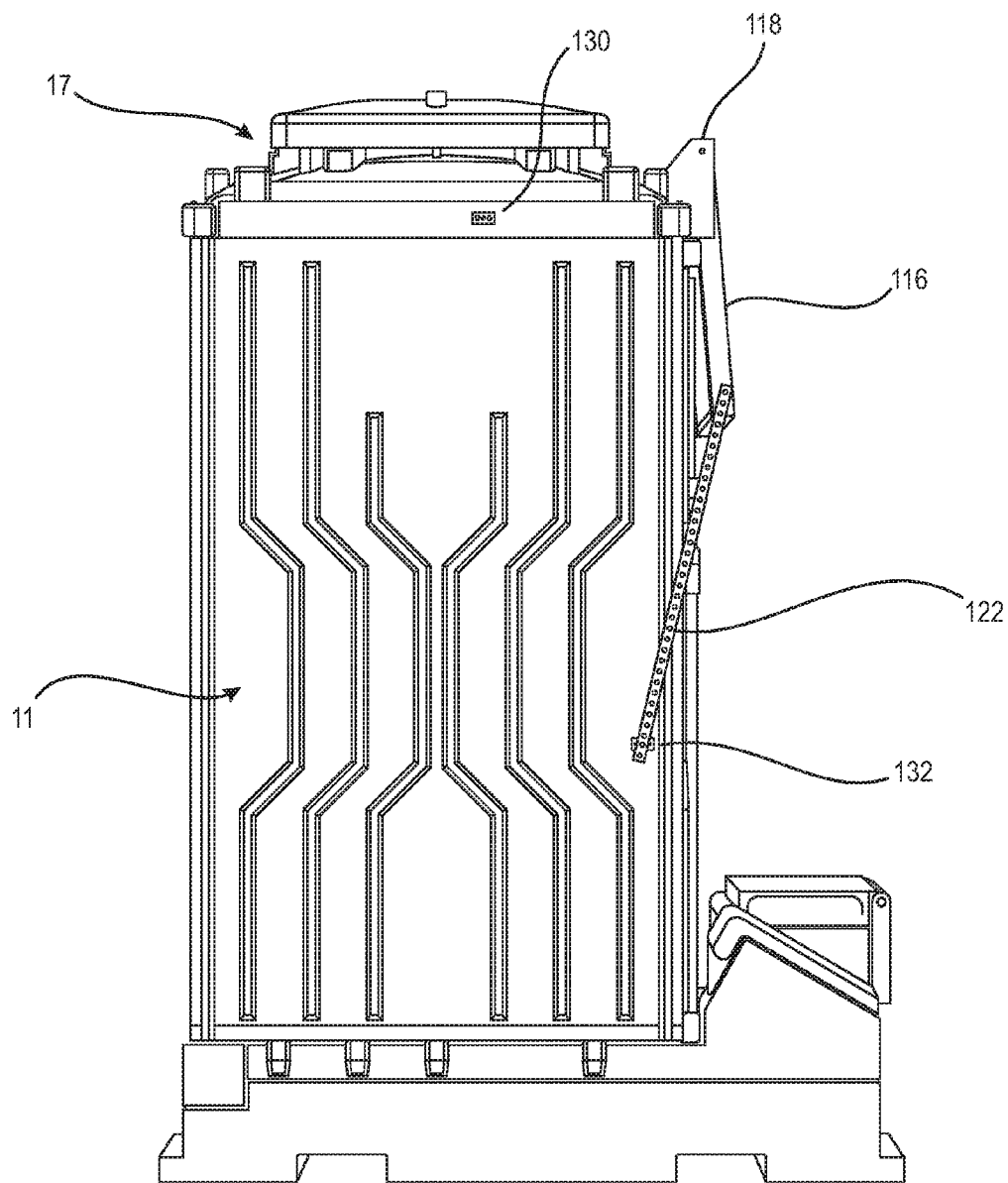
FIG. 16 is side elevational view of the transportable restroom of FIG. 1, showing the solar panel in a transport position.
Figure 17:
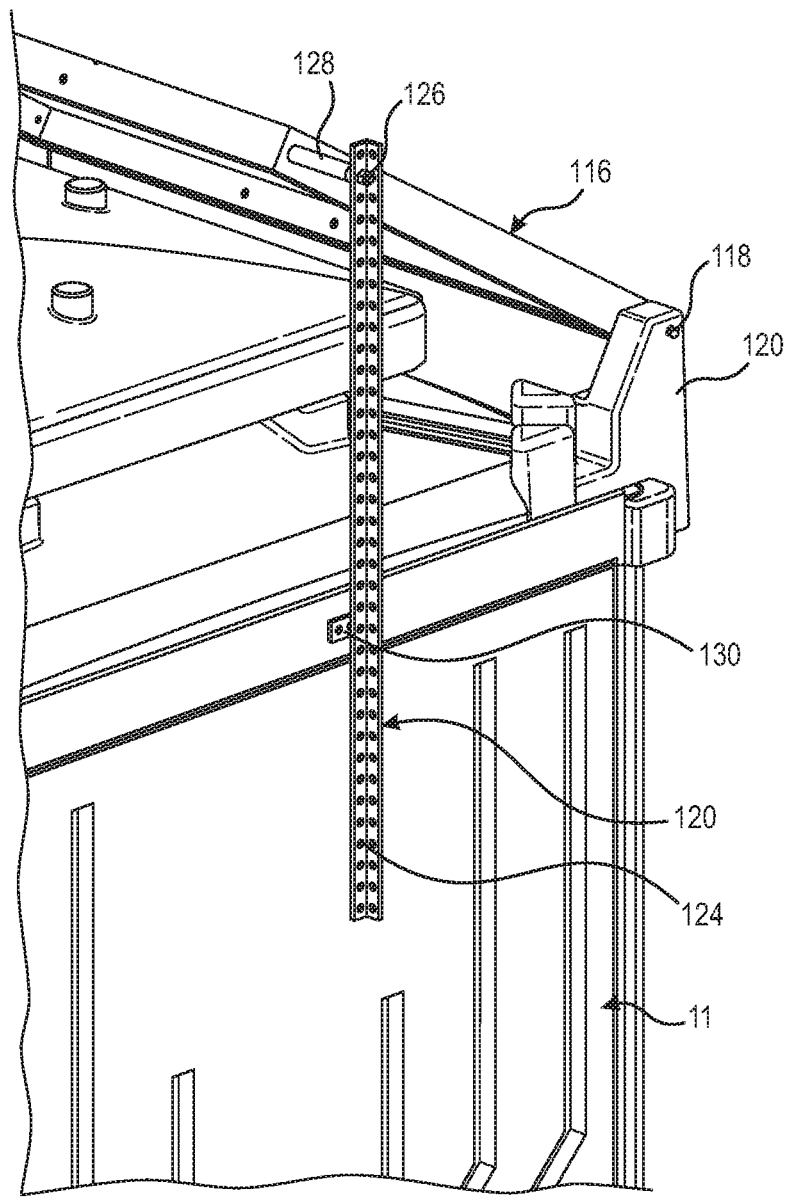
FIG. 17 is a perspective view of the solar panel in the deployed position.
Figure 18:
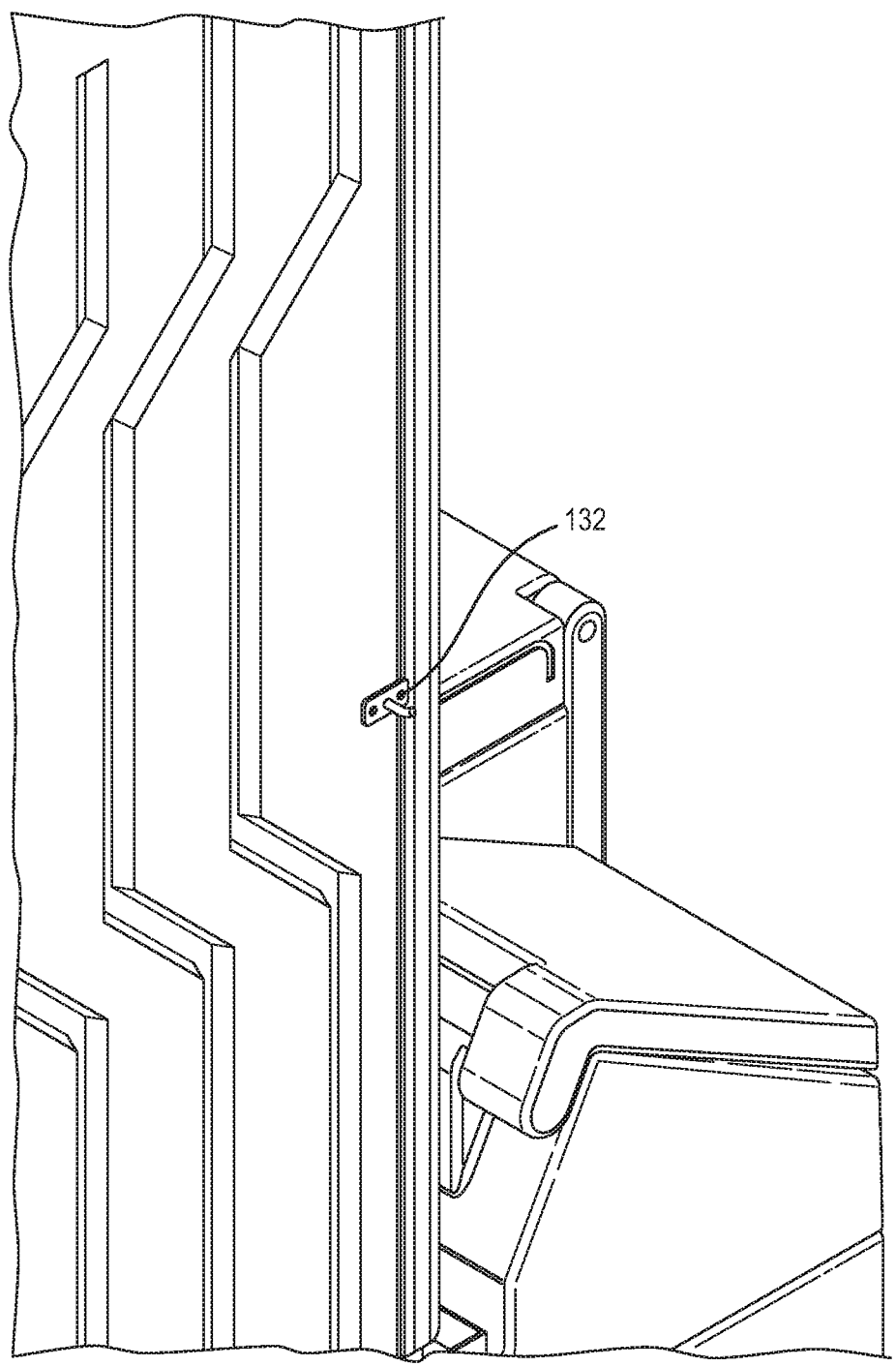
FIG. 18 is perspective view of a side of the transportable restroom of FIG. 1, showing a pin used to place the solar panel in the transport position.

Referring to FIGS. 10, 16 and 17, a solar panel 116 is positionable between a transport position and a deployed position. The solar panel is pivotably attached to the roof 17 at pivots 118. When in the transport position, the solar panel 116 is disposed vertically downwardly from the pivots 118, substantially close to the rear wall of the restroom 2. The solar panel 116 is rotatable by more than 180° from the deployed position to the transport position to advantageously position the operative face of the solar panel close to the rear wall of the restroom for protection during transport. When in the deployed position, the solar panel 116 is angled toward the sun to received maximum solar radiation, preferably between 10° to 40° from the horizontal plane. A pair of attachment portions 120 molded into the roof 17 (one is visible) support the pivots 118. An arm 122 with multiple holes 124 has one end 126 pivotably attached to an opposite corner of the solar panel 116 with pivot 128. A pin 130 attached to an upper edge of the wall 11 a distance from the pivot 118 is used to receive one of the holes 124 to properly position the solar panel 116 toward the sun. A pin 132 disposed at lower portion of the wall 11 is used to secure the arm 122 when the solar panel 116 is the transport position. The operative face of the solar panel 116 is advantageously toward the wall 11 when in the transport position for protection. When deployed, the solar panel 116 is used to charge the battery.

Figure 19:
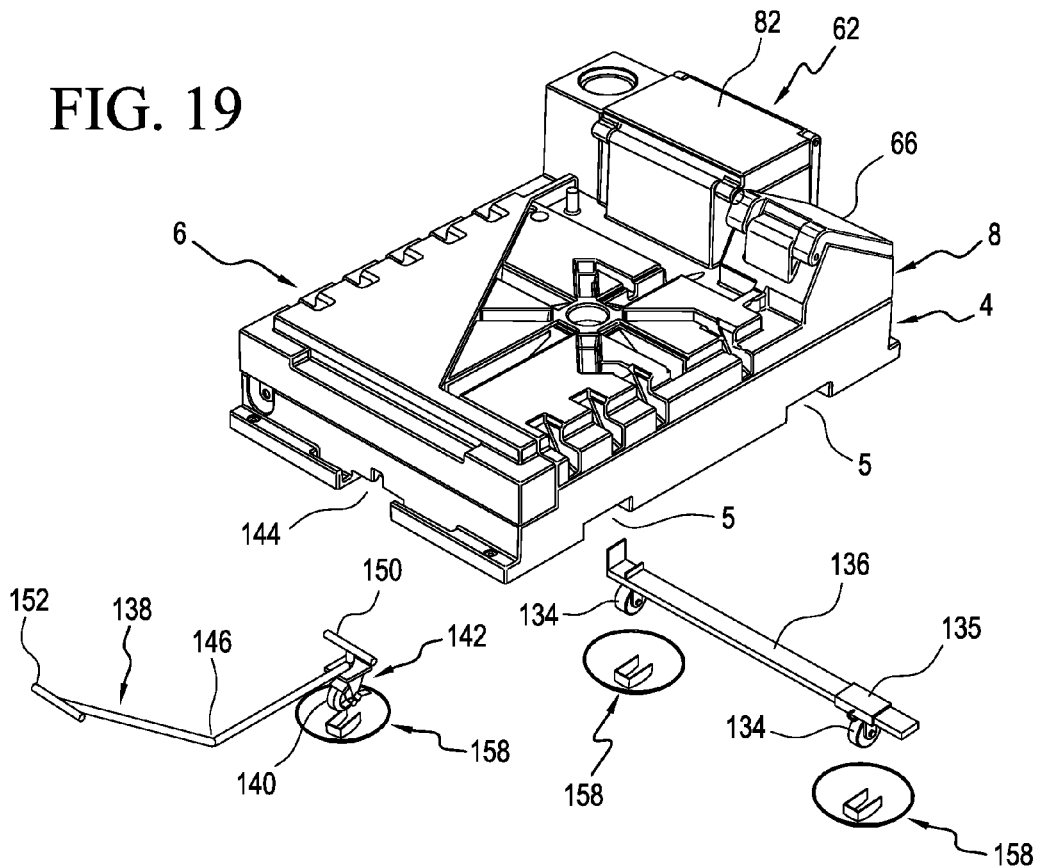
FIG. 19 is a front top perspective view of the unitary base shown in FIG. 9, showing a dolly system for moving the transportable restroom.

Referring to FIG. 19, a pair of wheels 134 attached to a longitudinal member 136 and a handle 138 with a wheel 140 at one end 142 may be used to move the restroom 2 to its final position after having been unloaded from a truck. The skid 4 has a recess 144 centered at the front side and an identical recess 145 centered at the rear side (see FIG. 3). One of the wheels 134 is attached to collar 135 which is slidable along the member 136 to shorten or lengthen the distance between the wheels 134 depending on the width of the lift gate of the truck used to transport the restroom 2. The collar 135 may be locked in place with a set screw 137 (see FIG. 25).

The wheels 134 and 140 are used on hard surfaces, such as asphalt or concrete. For sandy surfaces or soft dirt, convex shaped discs 158 are placed underneath the respective wheels to advantageously distribute the weight of the restroom over the larger surface area of the discs.

Figure 20:
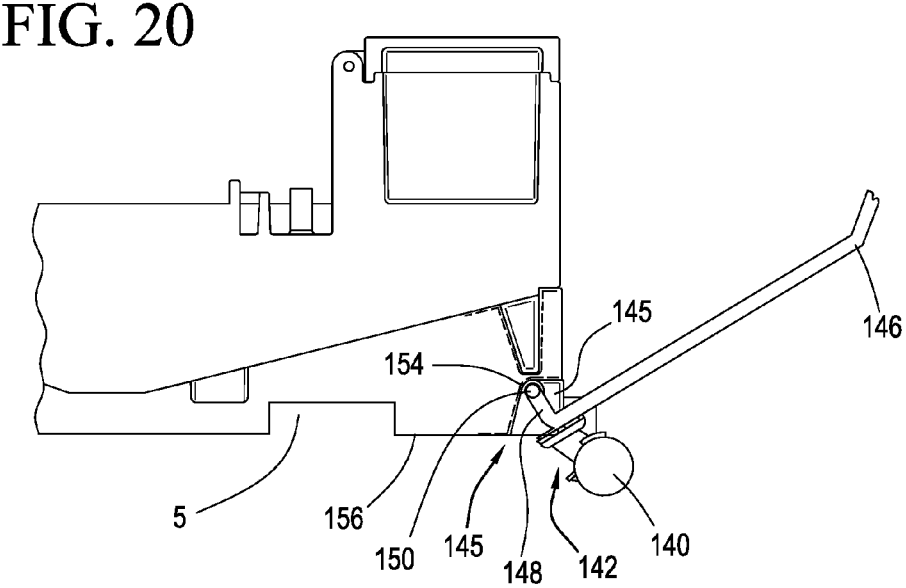
FIG. 20 is a cross-sectional view showing the engagement of a wheeled handle with the underside of the skid.
Figure 21:
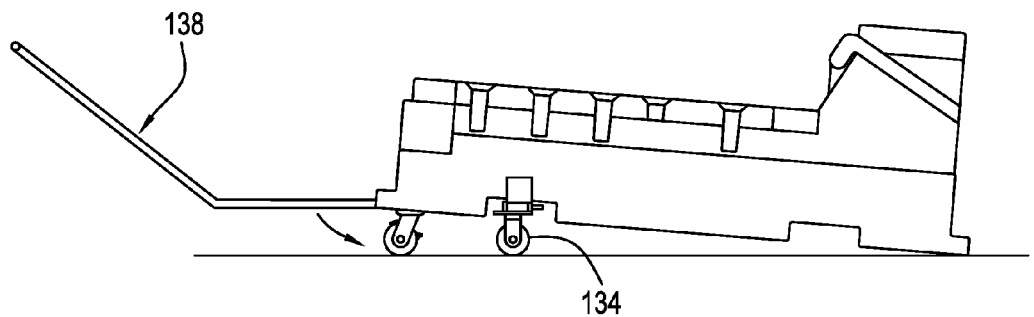
FIG. 21 is a side elevational view showing the lifting of the front end of the unitary base to allow insertion of a carriage underneath the base.

Referring to FIG. 20, the handle 138 is bent at an intermediate portion 146. The end 142 includes a bent portion 148 and a cross-member 150. The other end of the handle 138 has a cross-member 152 for convenient gripping by the user.

Figure 22:
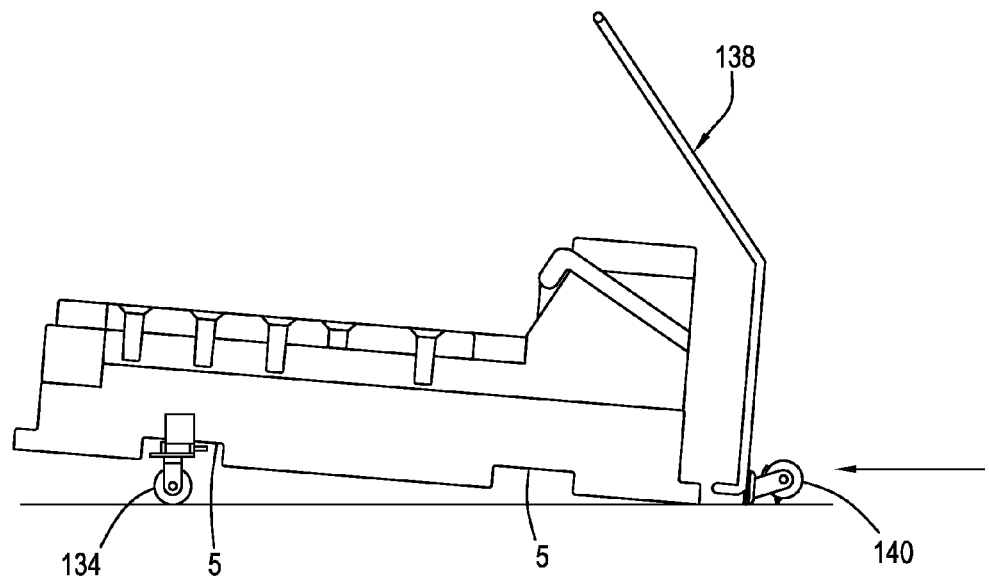
FIG. 22 is a side elevational view of the unitary base showing the act of inserting the wheeled handle at the rear end of the base.
Figure 23:
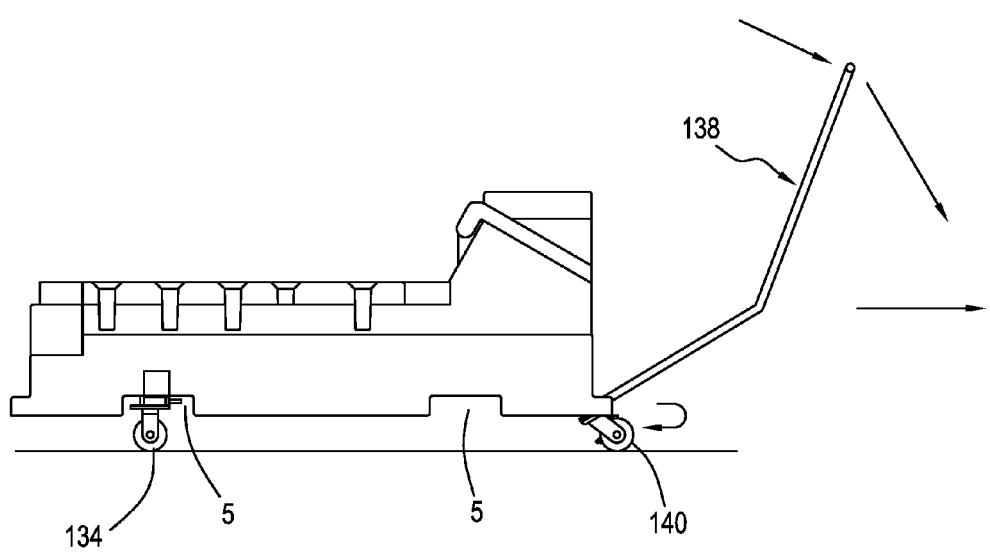
FIG. 23 is a side elevational view of the unitary base lifted from the ground and ready to be wheeled away.

Referring to FIG. 20 with the understanding that the structure disclosed for the recess 145 is identical to the recess 144, when the end 142 is inserted into the recess 145, the cross-member 150 engages a support wall 154 of the recess 145 disposed at a distance above the bottom surface 156 of the skid 4 less than the distance between the cross-member 150 and the bottom of the wheel 140. Consequently, pushing the handle 138 downwardly is effective to lift the surface 156 above the ground, providing enough clearance to slip the wheels 134 into the slot 5 thereby to place the wheel 134 underneath the skid 4. The wheels 134 may then be positioned in the slot 5 lifted above the ground by the handle 138. Once the wheels 134 are positioned in the slot 5, the handle 138 is removed from the recess 145 and inserted in the recess 144 at the front of the skid 4 to lift it, as shown in FIGS. 22 and 23. The handle 138 is then pulled to move the restroom 2. The operation may be reversed, starting with the recess 144 and then with the recess 145 and then pulling the restroom 2 at the rear end.

Figure 24:
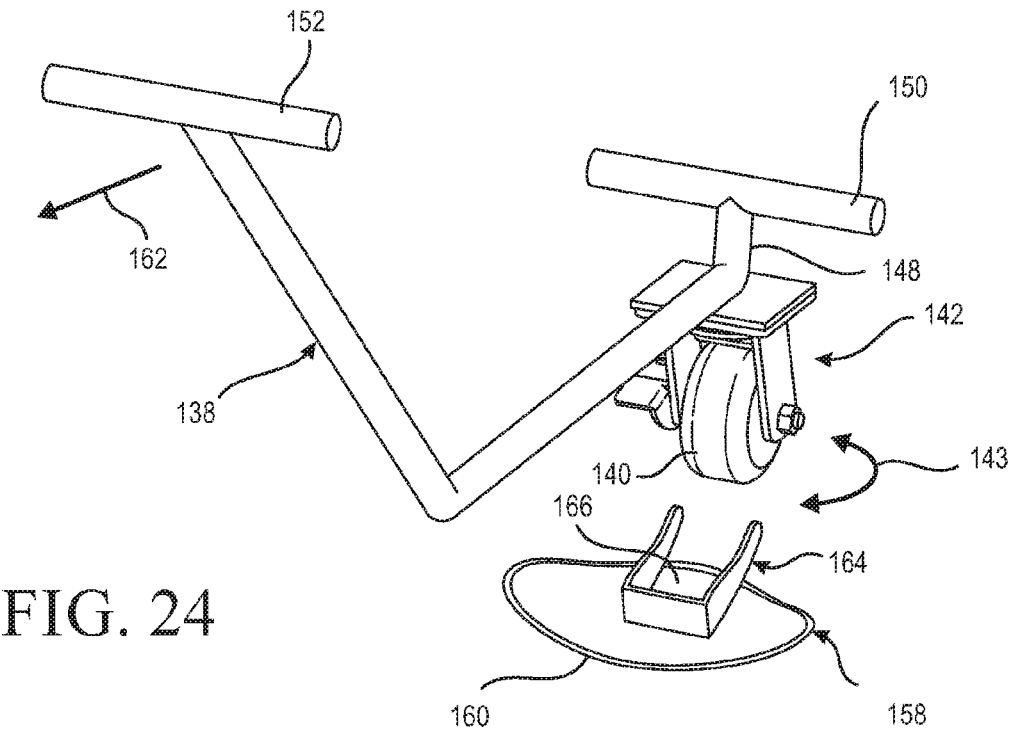
FIG. 24 is a perspective view of a handle with a wheel and a disc to be placed underneath the wheel.
Figure 25:
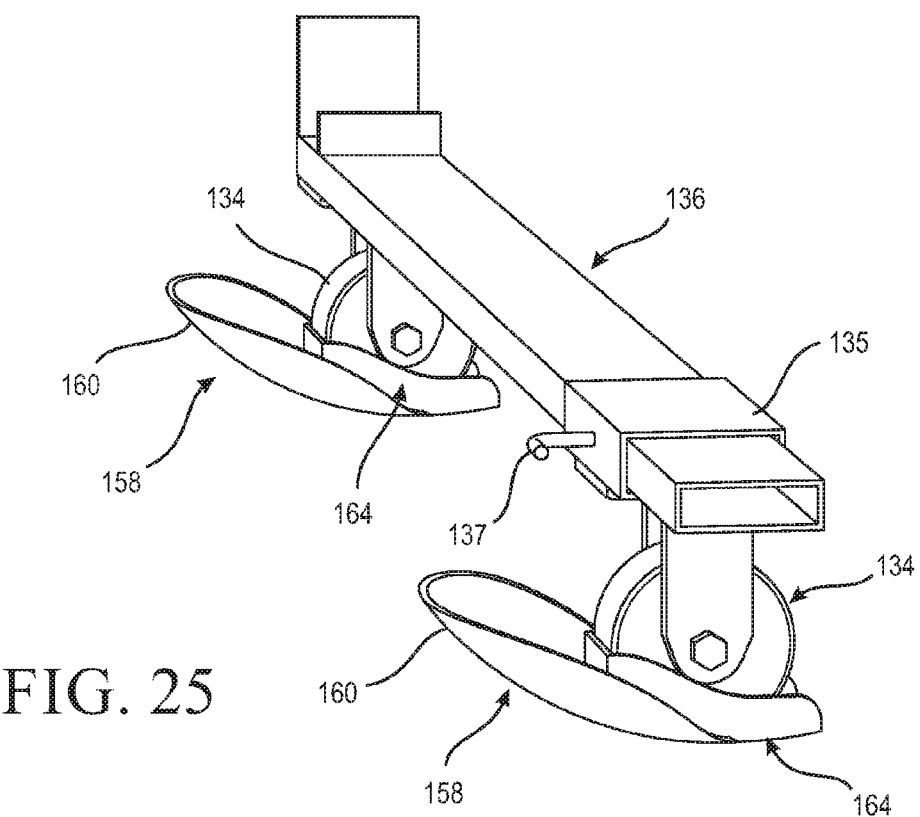
FIG. 25 is a perspective view of a pair of wheels riding on respective discs.
Figure 26:
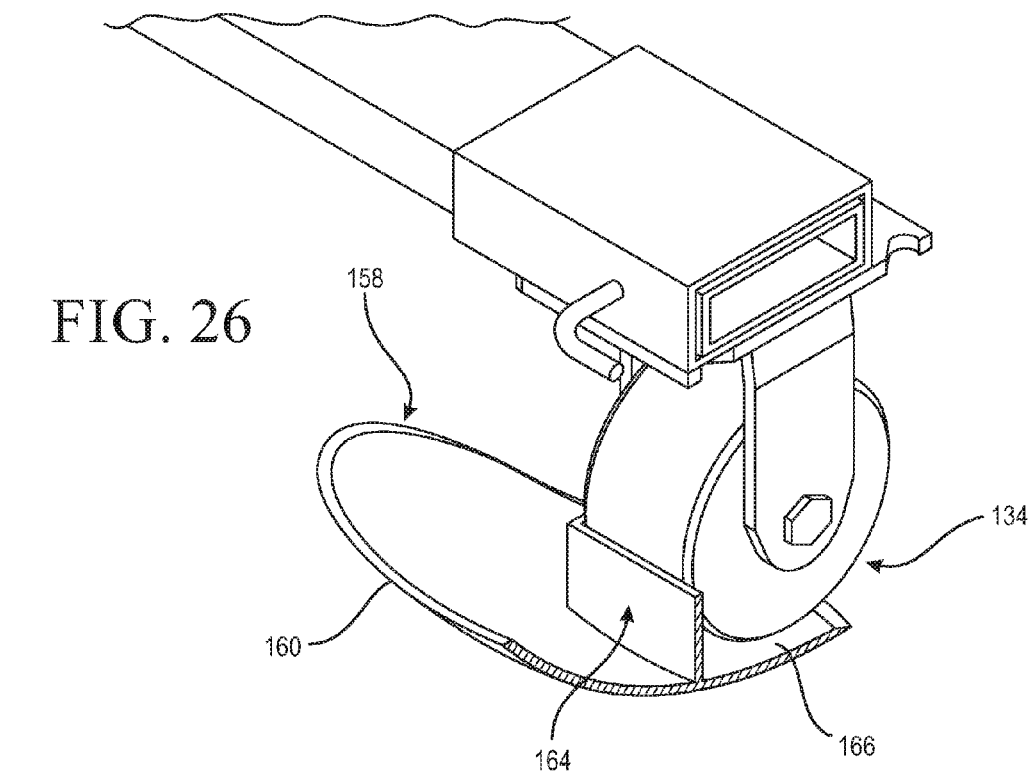
FIG. 26 is a perspective view with portions shown in cross-section showing a disc supporting a wheel.
Figure 27:
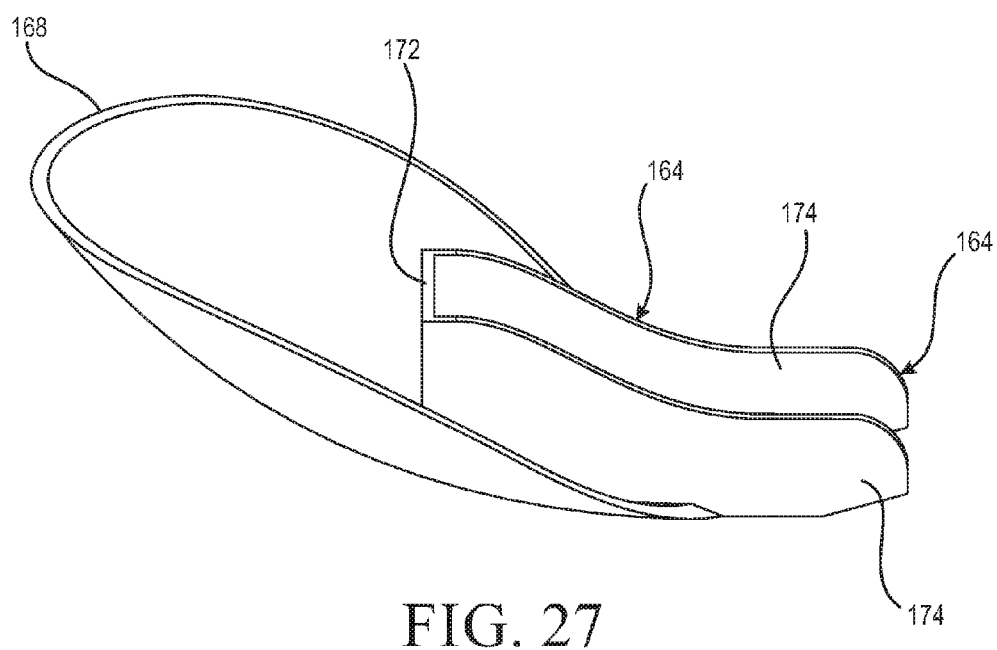
FIG. 27 is a perspective view of a disc.
Figure 28:
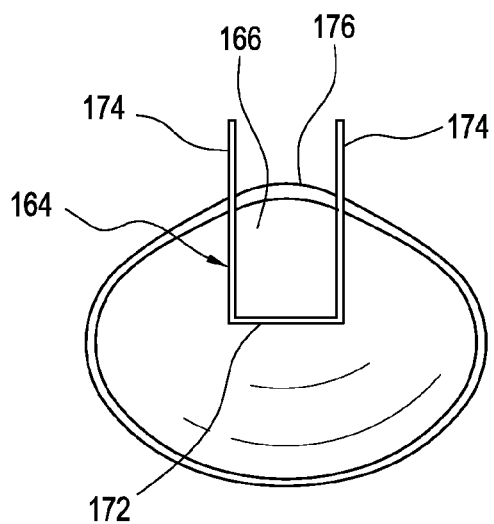
FIG. 28 is a top view of a disc.
Figure 29:
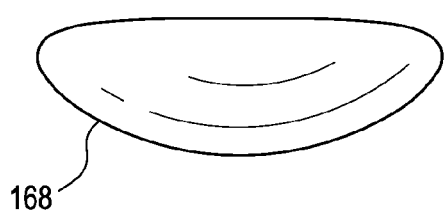
FIG. 29 is front end view of the disc of FIG. 28.
Figure 30:
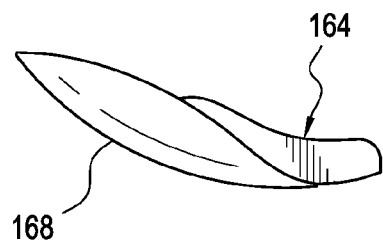
FIG. 30 is a side elevational view of the disc of FIG. 28.

Referring to FIGS. 24-26, the wheel 140 is pivotable about a vertical axis in the direction 143 to allow the operator to guide the wheel 140 in the desired direction. The discs 158 are disposed underneath the respective wheels 134 and 140 so that a concave surface 160 is presented to the dirt or sand in the direction 162 the restroom is pulled. Each of the discs 158 has wheel receiver 164 that holds the respective wheel at rear portion 166 inside the disc so that the leading surface 160 of the disc is lifted up to skim over the sand or dirt when the restroom is pulled.

Referring to FIGS. 27-30, the disc 158 is shaped like a dish with a continuously convex bottom surface 168 and a curved peripheral edge 170. The receiver 164 has front wall 172 and side walls 174. The receiver 164 is disposed at the rear portion 166 of the disc, with side walls 174 extending beyond the rear edge 176 of the disc, allowing the side walls 174 to be guided to receive the respective wheel before the wheel is pulled onto the disc. The weight of the restroom bearing on the rear portion of the discs 158 through the respective wheels advantageously keeps the leading surface 160 raised up to slide over the sand or dirt.

The discs 158 can have any shape when viewed from the top, such as ski shaped, as long as the weight of the restroom is distributed over the larger surface area of the discs and they can glide over the sand or dirt.

Figure 31:
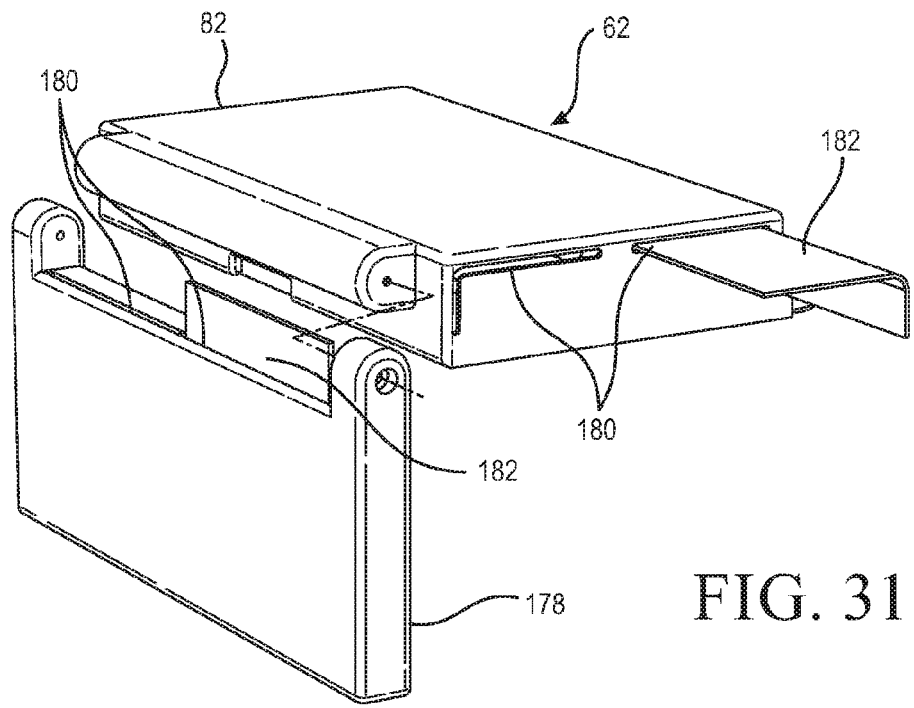
FIG. 31 is a perspective view of a cover and a wall of battery housing.
Figure 32:
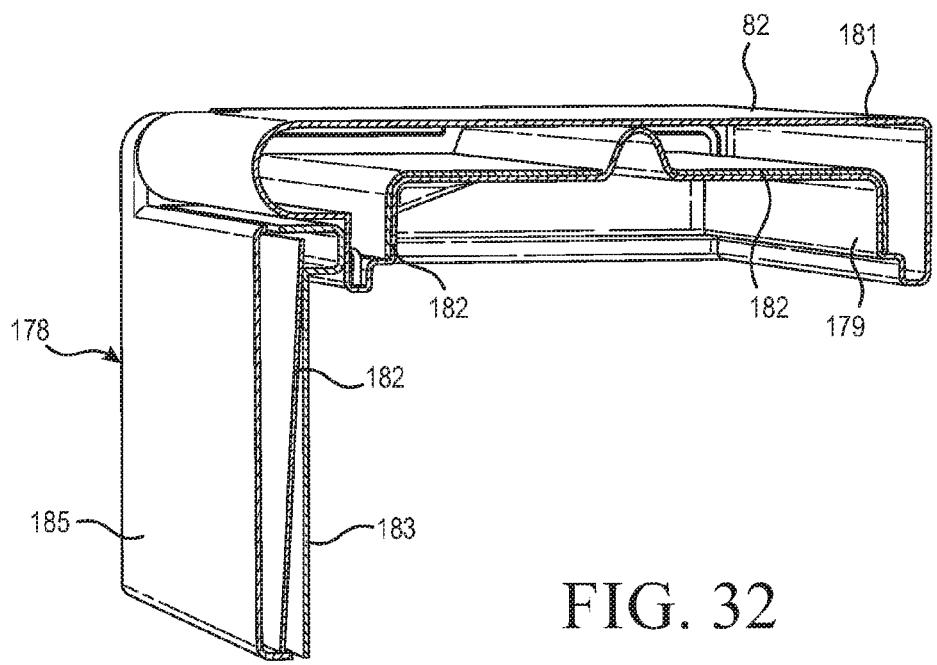
FIG. 32 is a cross-sectional view of a wall and a cover of battery housing, showing radiant barrier sheets inside the wall and the cover.

Referring to FIGS. 31 and 32, the battery housing 62 has side wall 178 and a cover 82. The cover 82 has an inner wall 179 and an outer wall 181. The side wall 178 has an inner wall 183 and an outer wall 185. The cover 82 and side wall 178 are provided with slots 180 for insertion of radiant barrier sheets 182 into the interior space of the side wall 178 and the cover 82. The radiant barrier sheets 182 advantageously reflect radiant heat from the sun away from the battery inside the housing 62. The radiant barrier sheet 182 is preferably made of an aluminum foil layer over a polyethylene sheet, commercially available from ASTRO-FOIL International. The aluminum foil advantageously reflects radiant heat away from the interior of the battery housing 62. The barrier sheets 182 helps to keep the battery from overheating when the battery housing 62 is exposed to the sun.

Figure 33:
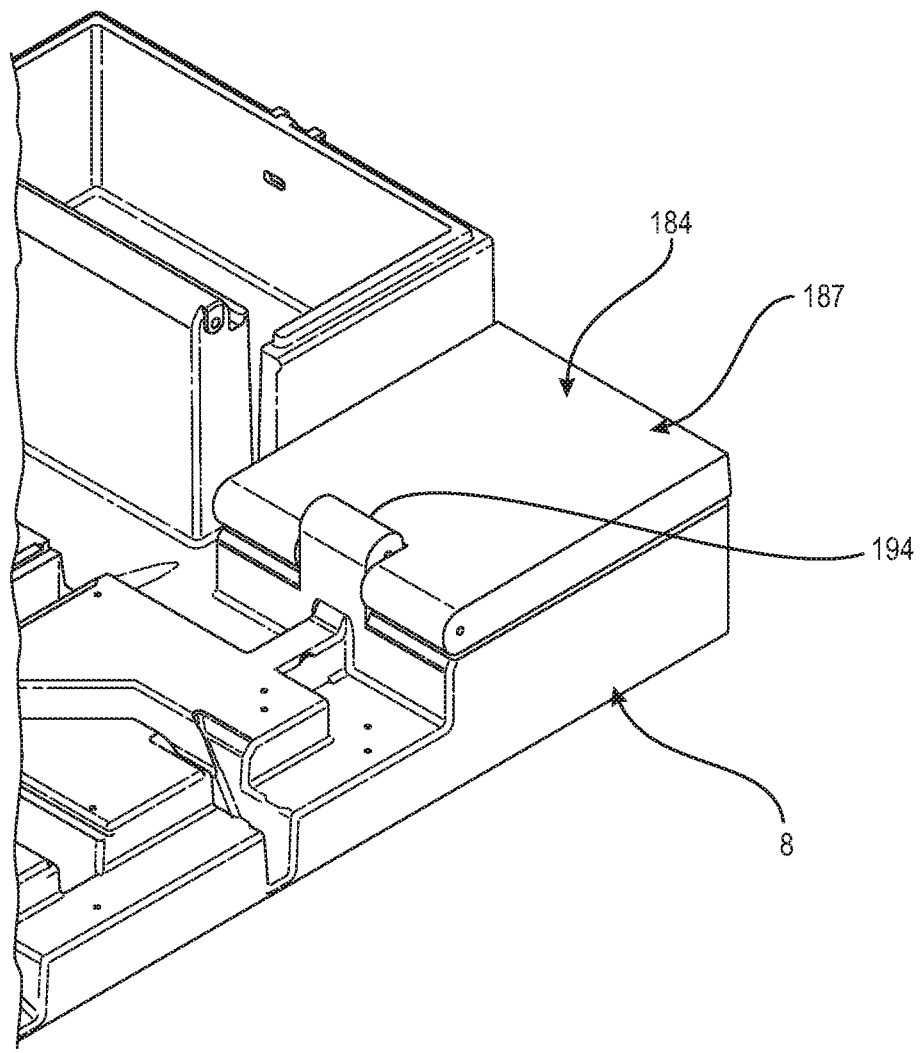
FIG. 33 is perspective view of a cover over an access opening of a waste water tank.
Figure 34:
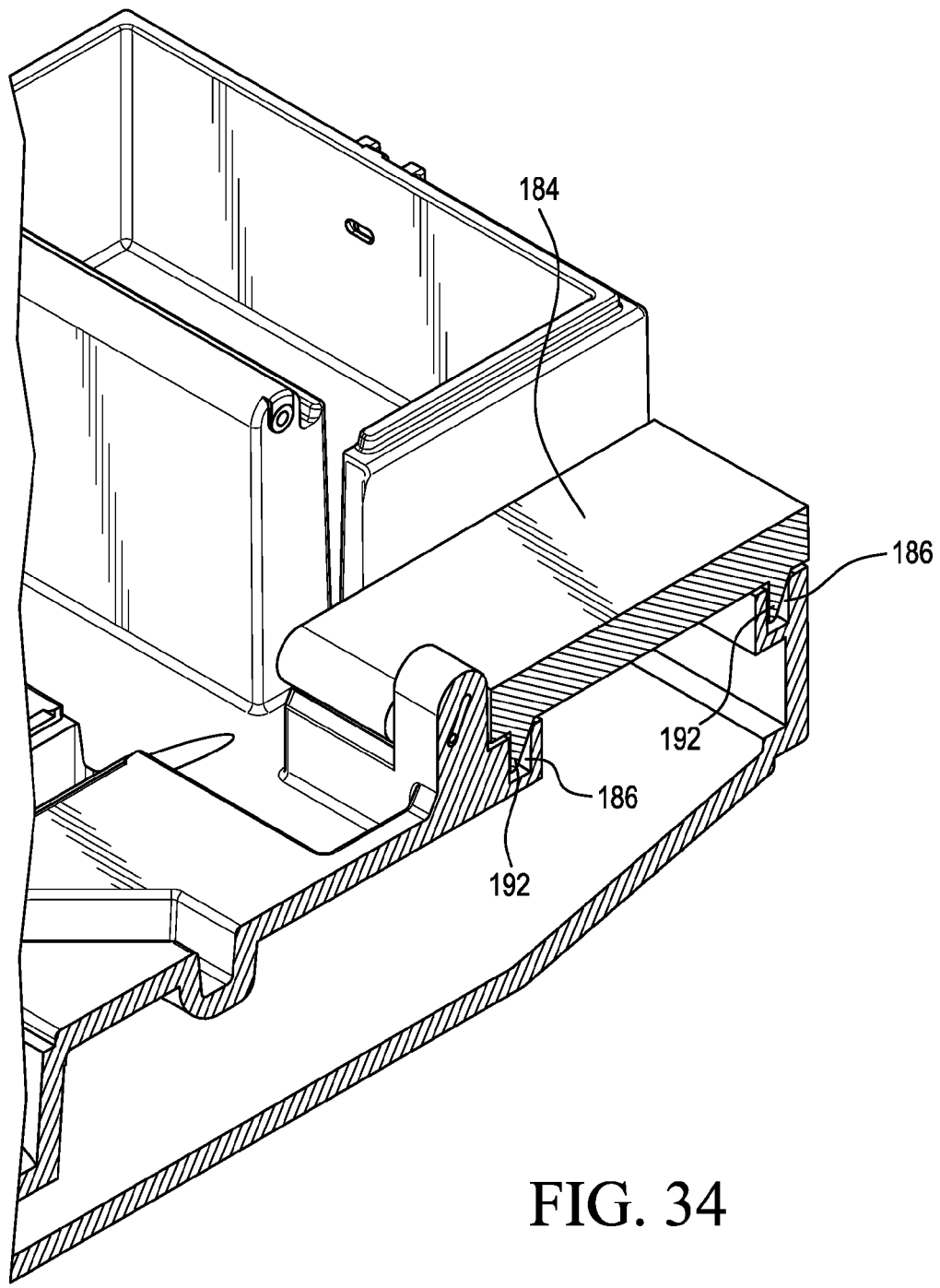
FIG. 34 is a cross-sectional view of the cover and the access opening of FIG. 33.
Figure 35:
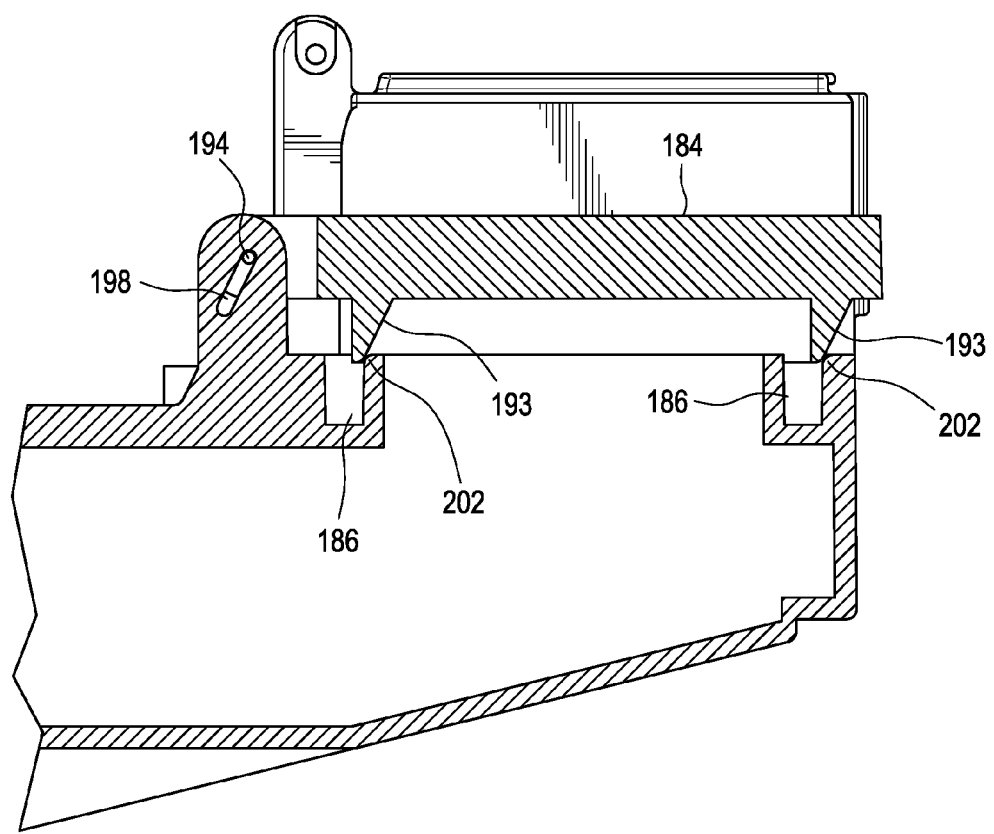
FIG. 35 is a cross-sectional view of the cover and the access opening of FIG. 33, showing the cover being opened.

Referring to FIGS. 33 and 35, an access 187 into the interior of the waste water tank that advantageously keeps the odor from escaping to the outside is disclosed. The access 187 includes a cover 184 and a groove 186 disposed around the periphery of the access opening 188. The groove 186 is horizontal so that water will fill the entire course of the groove. A projection 190 extends downwardly from the underside of the cover 184 and is disposed within the groove 186 when the cover is closed. The projection 190 makes a complete circuit and uninterrupted run within the groove 186. When the groove 186 is filled with water, the lower edge portion 192 of the projection 190 is immersed in the water, thereby blocking the path of air from the interior of the waste water tank 8 to the outside. Odor is kept within the waste water tank 8 since the path of air from the interior would follow the interior surface of the cover 184 and the projection 190 that is blocked by the water within the groove 186. The projection 190 may be wedge shaped with a vertical side 191 and a ramped side 193, but can be any shape as long as the lower edge portion 192 is completely immersed in the water within the groove 186.

A hinge 194 attaches the cover 184 to the tank 8. A pin 196 attached to the cover 184 is captured within an inclined slot 198. The cover 184 is opened by pulling on the cover horizontally, causing the pin 196 to ride on the slot 198 and the ramped side 193 on the upper edge 202 of the groove 186. The displacement of the cover along the slot 198 serves to clear the projection 190 from the groove 186 so that the cover can then be rotated and opened.

Figure 36:
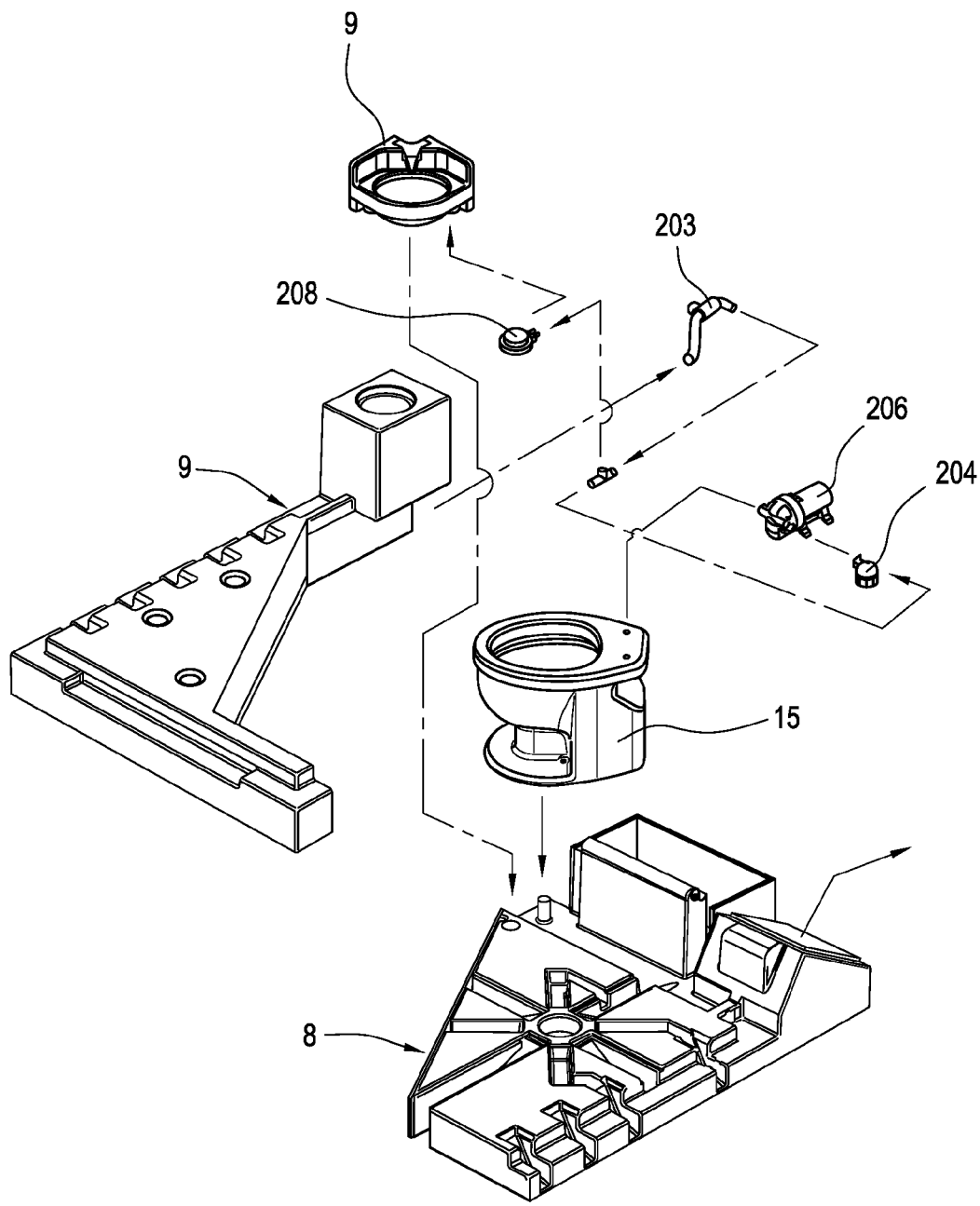
FIG. 36 is a plumbing schematic of the restroom of FIG. 1.

Referring to FIG. 36, a plumbing circuit for the restroom 2 is disclosed. Water from the clean water tank 6 is fed to the toilet 15 via a strainer and check valve 203 to a filter 204 and an electric pump 206 powered by a battery. Water from the clean water tank 6 is also fed to the hand wash 9 via a foot pump 208. Waste water from the toilet and the hand wash flows into the waste water tank 8.

Figure 37:
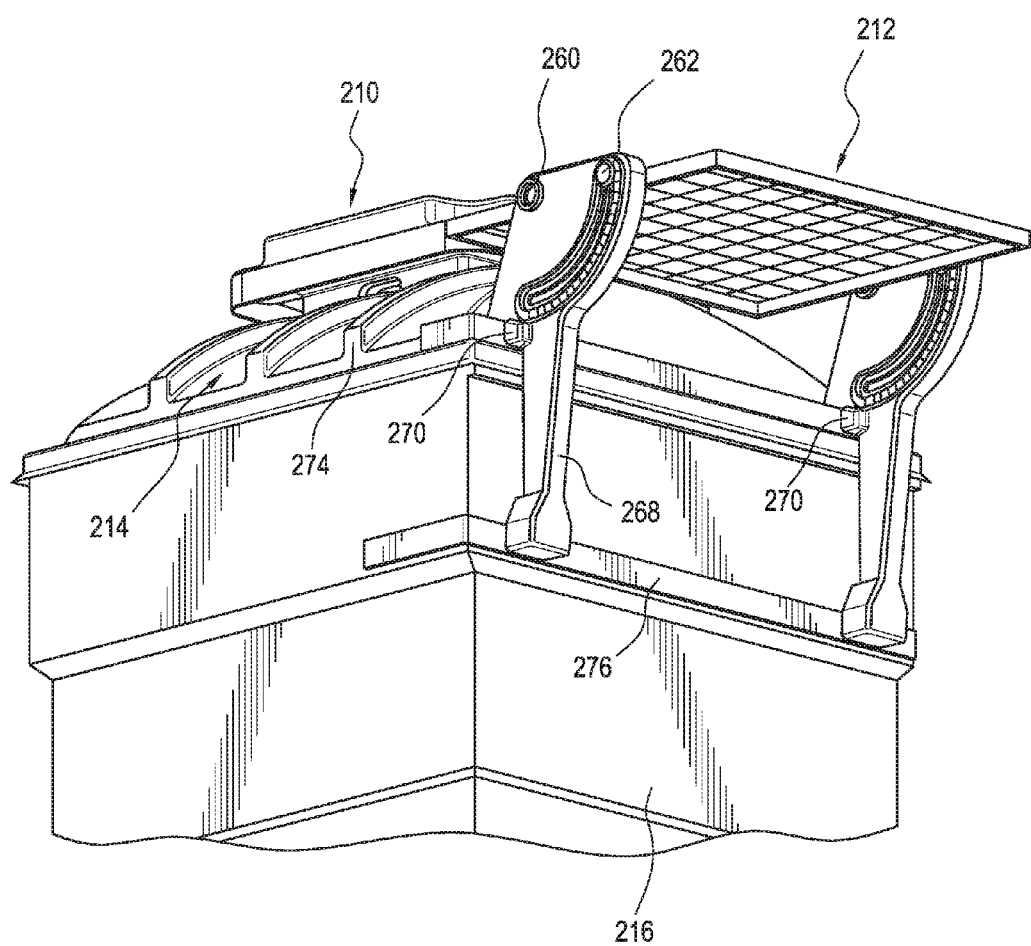
FIG. 37 is a perspective view of roof assembly of a portable restroom.

Referring to FIG. 37, a fan assembly 210 and a solar panel assembly 212 are shown installed on a roof 214 of a portable restroom, shown partially with walls 216. The roof 214 is preferably curved outwardly. The fan assembly 210 may be used to retrofit a standard portable restroom to provide inside ventilation. The solar panel assembly 212 may be made as a retrofit for a standard portable restroom to power the fan assembly 210 when installed.

Figure 38:
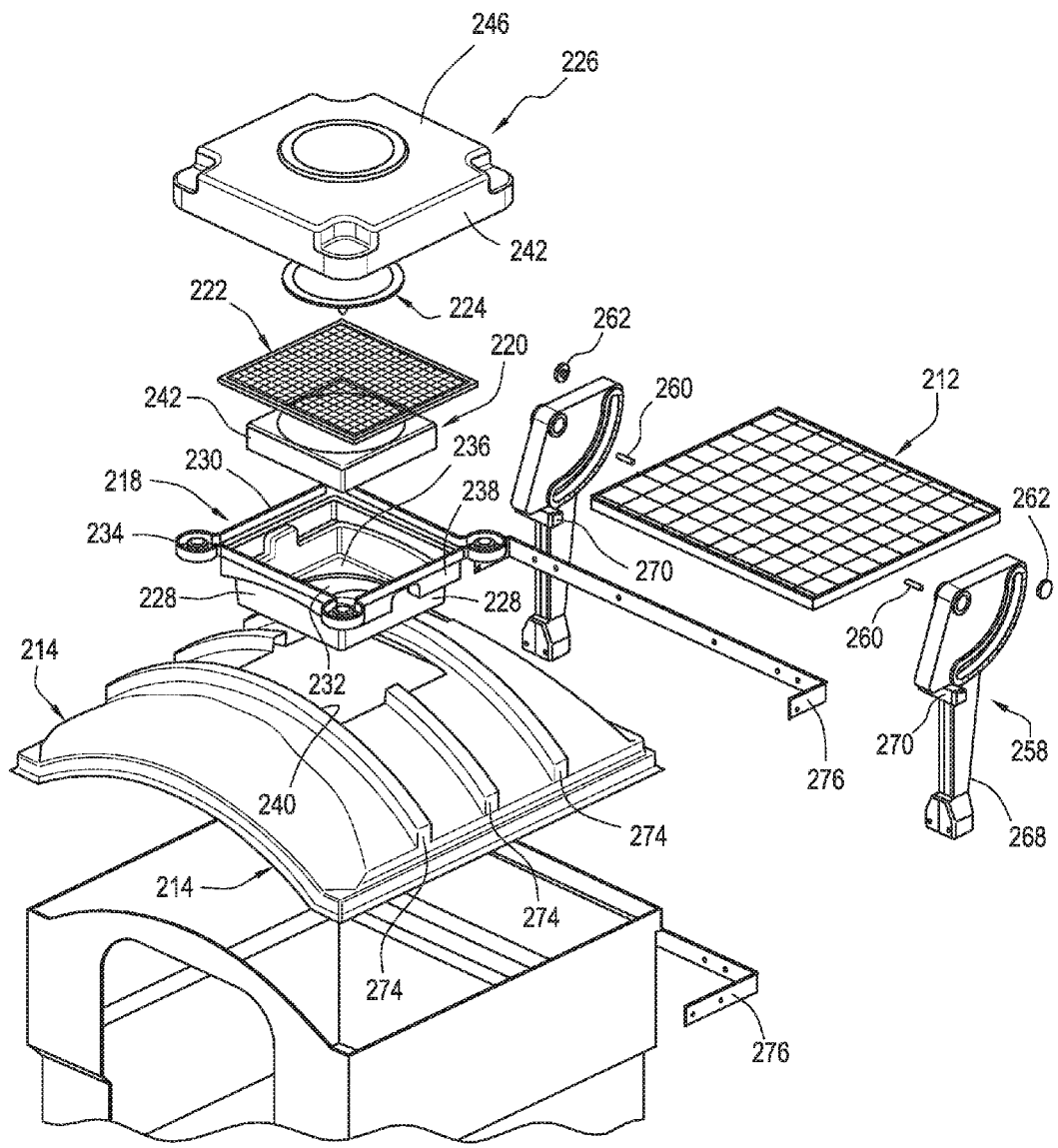
FIG. 38 is an assembly view of FIG. 37.

Referring to FIG. 38, the fan assembly 210 includes a fan housing 218, electric fan 220, insect screen 222, an air deflector 224 and vent cover 226.

The fan housing 218 includes four side walls 228, a top opening 230 and a bottom opening 232. Extension portions 234 extend outwardly from the side walls 228 at an upper portion of the side walls 228. A flange portion 236 extends inwardly around the bottom opening 232. Flange portions 238 extend outwardly from the side walls 228 at an upper portion of the side walls 228. The fan housing 218 is configured to sit within an opening 240 in the roof of the portable restroom. The flange portions 238 overlie the roof portions around the opening 240, thereby to be supported by the roof while the rest of the fan housing remains within the interior of the portable restroom and below the roof 214.

The electric fan 220 includes a support frame 242 supported inside the fan housing 218 by the flange portion 236. The insect screen 222 may be disposed above the fan 220 in a standard manner that will seal the opening 232 from insects that may come in from the outside.

Figure 39:
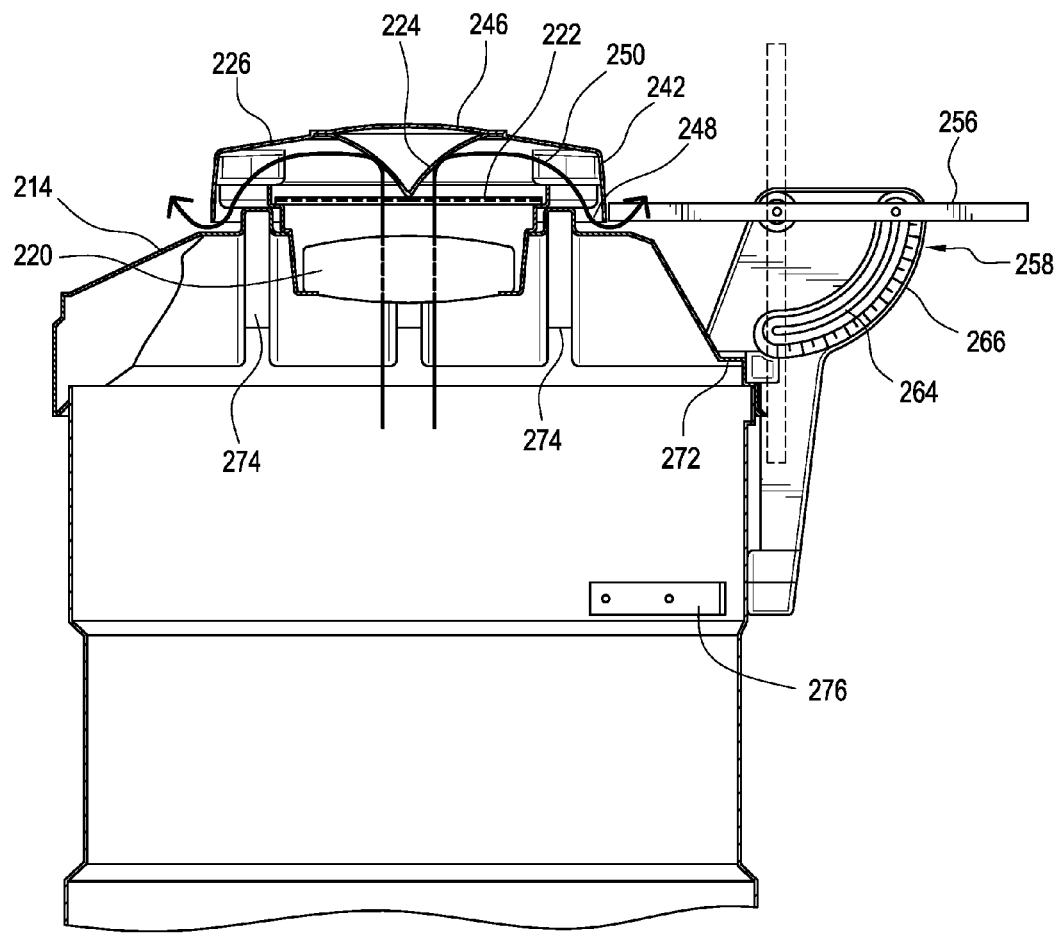
FIG. 39 is a cross-sectional view of FIG. 37.

Referring to FIGS. 38 and 39, the vent cap 226 includes side walls 242 and a top wall overlying the top opening 230. The sidewalls 242 are configured to include within the vent cap the extension portions 234 such that a gap 248 is provided between the sidewalls 228 the fan housing and the sidewalls 242 of the vent cap. The top wall 246 is disposed spaced apart from the sidewalls 228 of the fan housing to provide another gap 250 communicating with the gap 248. The bottom edges 252 of the side walls 242 are spaced apart from the roof 214 to provide yet another gap 254 that communicates with the other gaps 248 and 250 to provide an outlet for the airflow from the fan 220 to the outside. The extension portions 234 are preferably disposed at respective corners of the side walls 228. The inverted cone 224 may be attached to an underside of top wall 246 of the vent cover.

The solar panel assembly 212 includes a solar panel 256 for converting sunlight to electric power to power the electric fan 220. Mounting brackets 258 are used to attach the solar panel 256 to the wall 216 of the portable restroom. The brackets 258 allow for various positioning of the solar panel 256 between a horizontal position at 0° (shown in FIG. 38) and a vertical position at 90° to the horizontal (shown in FIG. 38 in broken lines). The 90° adjustability of the solar panel 256 advantageously allows for most efficient orientation of the solar panel toward the sun in any location in the world. The solar panel 256 is pivotably attached to the brackets with pins 260 and locked at the desired orientation with locking knobs 262. Arcuate slots 264 are provided in the brackets 258. The locking knobs 262 are received in the respective slots 264 and operably attached to the solar panel 256. Angle markings 266 are provided along the edge of the slots 264 to indicate the angular position of the solar panel 256 along the slots 264.

Each of the mounting brackets 258 includes arm portions 268 for attachment to the wall 216 of the portable restroom. Flange portions 270 extending transversely from the respective arm portions 268 are attached to a ledge portion 272 of the roof 214 of the portable restroom. The flange portions 270 advantageously locate the brackets 258 at the correct height.

The roof 214 of the portable restroom includes raised ribs 274 preferably running parallel to each other. The opening 240 in the roof is preferably located between two of the ribs 274. The vent cover 226 is configured to extend beyond the raised ribs adjacent to the opening 240 to advantageously prevent water from entering the opening 240. Water flowing down on the side walls 242 of the vent cover 226 will hit the roof 214 beyond the opening 240 and any backflow will be stopped by the raised ribs 274.

Mounting metal straps 276, preferably made of aluminum, may be attached to the outside and inside of the walls 216 and to the roof to provide a rigid and strong attachment areas for the mounting brackets 258.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A roof assembly for a portable restroom, comprising:
a) a roof having a plurality of raised ribs extending parallel to each other, the roof including an opening between two of the raised ribs;
b) a fan housing extending into the opening of the roof, the fan housing having sidewalls and top and bottom openings, the fan housing including extension portions extending outwardly from the sidewalls, the fan housing including flange portions extending outwardly at a top portion of the sidewalls to overlap portions of the roof around the opening, the flange portions being disposed on the raised ribs;
c) a fan supported on a bottom portion of the fan housing; and
d) a vent cap with sidewalls and a top wall overlying the top opening of the fan housing, the sidewalls of the vent cap are configured to include the extension portions within the vent cap such that a first gap is provided between the sidewalls of the fan housing and the sidewalls of the vent cap, the top wall is disposed spaced apart from the sidewalls of the fan housing to provide a second gap communicating with the first gap.

2. A fan assembly as in claim 1, wherein:
a) the sidewalls form corners; and
b) the extension portions are disposed at respective corners of the sidewalls.

3. A fan assembly as in claim 1, and further comprising an inverted cone operably attached to an underside of the top wall.

4. A roof assembly as in claim 1, wherein the roof is convex.

5. A transportable restroom, comprising:
a) a one-piece skid;
b) a clean water tank carried by the skid;
c) a waste water tank carried by the skid;
d) the clean water tank and the waste water tank are disposed side to side on the skid to form a unitary base;
e) wall extending from the base including a door;
f) a roof over the wall, the roof having a plurality of raised ribs extending parallel to each other, the roof including an opening between two of the raised ribs;
g) a fan housing extending into an opening in the roof and an electric fan disposed in the fan housing to exhaust air from the inside of the restroom to the outside, the electric fan being supported on a bottom portion of the fan housing;
h) a cap disposed over the opening, the cap including a downwardly extending peripheral wall having a bottom edge spaced apart from the roof to provide an outlet to the outside for the air being exhausted from the inside, the peripheral wall including first and second opposite sides disposed beyond the respective two of the raised ribs;
i) a solar panel attached to the portable restroom;
j) first and second brackets attached to the wall of the portable restroom;
k) the solar panel is pivotably attached between the first and second brackets, the solar panel being positionable between a horizontal position to a vertical position;
l) the first and second brackets including respective first and second arcuate slots; and
m) first and second locks operably attached to the solar panel and the respective first and second arcuate slots, the first and second locks being received within the first and second arcuate slots to lock the solar panel in a selected position between the horizontal position and the vertical position.

6. A transportable restroom as in claim 5, wherein the first and second brackets include angle markings along the arcuate slots.

7. A transportable restroom as in claim 5, wherein the first and second brackets include arms for attachment to the wall of the portable restroom.

8. A transportable restroom as in claim 7, wherein the first and second brackets include flange portions extending transversely from the respective arms for attachment to the roof of the portable restroom.

9. A transportable restroom as in claim 5, wherein the solar panel is positionable in inclination between the horizontal position at 0° and the vertical position at 90° from the horizontal position.

* * * * *